United States Patent
Kamkar et al.

(10) Patent No.: US 11,720,962 B2
(45) Date of Patent: Aug. 8, 2023

(54) SYSTEMS AND METHODS FOR GENERATING GRADIENT-BOOSTED MODELS WITH IMPROVED FAIRNESS

(71) Applicant: ZestFinance, Inc., Burbank, CA (US)

(72) Inventors: Sean Javad Kamkar, Los Angeles, CA (US); Geoffrey Michael Ward, Los Angeles, CA (US); Jerome Louis Budzik, Los Angeles, CA (US)

(73) Assignee: ZESTFINANCE, INC., Burbank, CA (US)

( * ) Notice: Subject to any disclaimer, the term of this patent is extended or adjusted under 35 U.S.C. 154(b) by 0 days.

(21) Appl. No.: 17/535,511

(22) Filed: Nov. 24, 2021

(65) Prior Publication Data
US 2022/0164877 A1    May 26, 2022

Related U.S. Application Data

(60) Provisional application No. 63/117,696, filed on Nov. 24, 2020.

(51) Int. Cl.
*G06Q 20/00* (2012.01)
*G06Q 40/03* (2023.01)
(Continued)

(52) U.S. Cl.
CPC ....... *G06Q 40/03* (2023.01); *G06F 18/24323* (2023.01); *G06N 20/00* (2019.01)

(58) Field of Classification Search
CPC ...... G06Q 40/02; G06Q 40/025; G06Q 40/03; G06N 20/00; G06F 18/24323
(Continued)

(56) References Cited

U.S. PATENT DOCUMENTS

| | | |
|---|---|---|
| 525,413 A | 9/1894 | Gates |
| 5,745,654 A | 4/1998 | Titan |

(Continued)

FOREIGN PATENT DOCUMENTS

| | | |
|---|---|---|
| WO | 2014014047 A1 | 1/2014 |
| WO | 2014055238 A1 | 4/2014 |

(Continued)

OTHER PUBLICATIONS

Ward, et al., "An exploration of the influence of path choice in game-theoretic attribuution algorithms," Journal of Machine Learning Research Under Review (2020), 21 pages.

(Continued)

*Primary Examiner* — Jessica Lemieux
*Assistant Examiner* — Mohammed H Mustafa
(74) *Attorney, Agent, or Firm* — Troutman Pepper Hamilton Sanders LLP; Christopher J. Forstner; Nicholas J. Gallo

(57) ABSTRACT

Systems and methods for generating tree-based models with improved fairness are disclosed. The disclosed process generates a first tree-based machine learning model, which is preferably trained to predict if a financial loan will be repaid. The process also determines an accuracy of the first tree-based machine learning mode. In addition, the process determines a fairness of the first tree-based machine learning model. The fairness is preferably associated with at least one of gender, race, ethnicity, age, marital status, military status, sexual orientation, and disability status. The process then generates a second different tree-based machine learning model, which is preferably trained based on the accuracy of the first tree-based machine learning model and the fairness of the first tree-based machine learning model. The process then combines the first tree-based machine learning model (Continued)

US 11,720,962 B2

Page 2 and the second tree-based machine learning model to produce a gradient-boosted machine learning model.

20 Claims, 8 Drawing Sheets

(51) Int. Cl.
G06N 20/00 (2019.01)
G06F 18/243 (2023.01)
(58) Field of Classification Search
USPC .................................................. 705/4, 35–45
See application file for complete search history.

(56) References Cited

U.S. PATENT DOCUMENTS

| | | | |
|---|---|---|---|
| 5,999,938 A | 12/1999 | Bliss | |
| 6,034,314 A | 3/2000 | Koike | |
| 6,877,656 B1 | 4/2005 | Jaros | |
| 7,035,811 B2 | 4/2006 | Gorenstein | |
| 7,280,980 B1 | 10/2007 | Hoadley | |
| 7,467,116 B2 | 12/2008 | Wang | |
| 7,499,919 B2 | 3/2009 | Meyerzon | |
| 7,542,993 B2 | 6/2009 | Satterfield | |
| 7,610,257 B1 | 10/2009 | Abrahams | |
| 7,711,635 B2 | 5/2010 | Steele | |
| 7,765,151 B1 | 7/2010 | Williams | |
| 7,813,945 B2 | 10/2010 | Bonissone | |
| 7,873,535 B2 | 1/2011 | Umblijs | |
| 7,873,570 B2 | 1/2011 | Cagan | |
| 7,921,359 B2 | 4/2011 | Friebel | |
| 7,941,363 B2 | 5/2011 | Tanaka | |
| 7,941,425 B2 | 5/2011 | Sahu | |
| 7,970,676 B2 | 6/2011 | Feinstein | |
| 7,987,177 B2 | 7/2011 | Beyer | |
| 7,996,392 B2 | 8/2011 | Liao | |
| 8,078,524 B2 | 12/2011 | Crawford | |
| 8,086,523 B1 | 12/2011 | Palmer | |
| 8,166,000 B2 | 4/2012 | Labrie | |
| 8,200,511 B2 | 6/2012 | Zizzamia | |
| 8,219,500 B2 | 7/2012 | Galbreath | |
| 8,280,805 B1 | 10/2012 | Abrahams | |
| 8,335,741 B2 | 12/2012 | Kornegay | |
| 8,442,886 B1 | 5/2013 | Haggerty | |
| 8,452,699 B2 | 5/2013 | Crooks | |
| 8,515,842 B2 | 8/2013 | Papadimitriou | |
| 8,554,756 B2 | 10/2013 | Gemmell | |
| 8,560,436 B2 | 10/2013 | Ingram | |
| 8,600,966 B2 | 12/2013 | Kravcik | |
| 8,626,645 B1 | 1/2014 | Lazerson | |
| 8,645,417 B2 | 2/2014 | Groeneveld | |
| 8,660,943 B1 | 2/2014 | Chirehdast | |
| 8,694,401 B2 | 4/2014 | Stewart | |
| 8,744,946 B2 | 6/2014 | Shelton | |
| 8,799,150 B2 | 8/2014 | Annappindi | |
| 9,047,392 B2 | 6/2015 | Wilkes | |
| 9,268,850 B2 | 2/2016 | El-Charif | |
| 9,405,835 B2 | 8/2016 | Wheeler | |
| 9,501,749 B1 | 11/2016 | Narsky | |
| 9,639,805 B1 | 5/2017 | Feller | |
| 9,686,863 B2 | 6/2017 | Chung | |
| 10,121,115 B2 | 11/2018 | Chrapko | |
| 10,581,887 B1 | 3/2020 | Dinerstein | |
| 10,684,598 B1 | 6/2020 | Alanqar | |
| 10,719,301 B1 | 7/2020 | Dasgupta | |
| 10,824,959 B1 | 11/2020 | Chatterjee | |
| 10,977,558 B2 | 4/2021 | Herbster | |
| 11,296,971 B1 | 4/2022 | Jain | |
| 2002/0038277 A1 | 3/2002 | Yuan | |
| 2002/0091650 A1 | 7/2002 | Ellis | |
| 2002/0138414 A1 | 9/2002 | Pitman | |
| 2002/0178113 A1 | 11/2002 | Clifford | |
| 2003/0009369 A1 | 1/2003 | Gorenstein | |
| 2003/0033242 A1 | 2/2003 | Lynch | |
| 2003/0033587 A1 | 2/2003 | Ferguson | |
| 2003/0046223 A1 | 3/2003 | Crawford | |
| 2003/0101080 A1 | 5/2003 | Frank | |
| 2003/0147558 A1 | 8/2003 | Loui | |
| 2003/0176931 A1 | 9/2003 | Pednault | |
| 2004/0068509 A1 | 4/2004 | Garden | |
| 2004/0107161 A1 | 6/2004 | Tanaka | |
| 2004/0199456 A1 | 10/2004 | Flint | |
| 2005/0055296 A1 | 3/2005 | Hattersley | |
| 2005/0114279 A1 | 5/2005 | Scarborough | |
| 2005/0234762 A1 | 10/2005 | Pinto | |
| 2005/0278246 A1 | 12/2005 | Friedman | |
| 2006/0047613 A1 | 3/2006 | Labreuche | |
| 2006/0083214 A1 | 4/2006 | Grim, III | |
| 2006/0106570 A1 | 5/2006 | Feldman | |
| 2006/0112039 A1 | 5/2006 | Wang | |
| 2006/0167654 A1 | 7/2006 | Keinan | |
| 2006/0200396 A1 | 9/2006 | Satterfield | |
| 2006/0218067 A1 | 9/2006 | Steele | |
| 2007/0005313 A1 | 1/2007 | Sevastyanov | |
| 2007/0011175 A1 | 1/2007 | Langseth | |
| 2007/0016542 A1 | 1/2007 | Rosauer | |
| 2007/0050286 A1 | 3/2007 | Abrahams | |
| 2007/0055619 A1 | 3/2007 | Abrahams | |
| 2007/0067284 A1 | 3/2007 | Meyerzon | |
| 2007/0106550 A1 | 5/2007 | Umblijs | |
| 2007/0112668 A1 | 5/2007 | Celano | |
| 2007/0124236 A1 | 5/2007 | Grichnik | |
| 2007/0288338 A1 | 12/2007 | Hoadley | |
| 2008/0133402 A1 | 6/2008 | Kurian | |
| 2008/0208820 A1 | 8/2008 | Usey | |
| 2008/0222061 A1 | 9/2008 | Soetjahja | |
| 2008/0306893 A1 | 12/2008 | Saidi | |
| 2008/0307006 A1 | 12/2008 | Lee | |
| 2009/0006283 A1 | 1/2009 | Labrie | |
| 2009/0006356 A1 | 1/2009 | Liao | |
| 2009/0015433 A1 | 1/2009 | James | |
| 2009/0024517 A1 | 1/2009 | Crooks | |
| 2009/0030888 A1 | 1/2009 | Sahu | |
| 2009/0037308 A1 | 2/2009 | Feinstein | |
| 2009/0192980 A1 | 7/2009 | Beyer | |
| 2009/0216748 A1 | 8/2009 | Kravcik | |
| 2009/0254572 A1 | 10/2009 | Redlich | |
| 2009/0299911 A1 | 12/2009 | Abrahams | |
| 2009/0319521 A1 | 12/2009 | Groeneveld | |
| 2010/0005018 A1 | 1/2010 | Tidwell | |
| 2010/0010878 A1 | 1/2010 | Pinto | |
| 2010/0010935 A1 | 1/2010 | Shelton | |
| 2010/0082476 A1 | 4/2010 | Bowman | |
| 2010/0257459 A1 | 10/2010 | Galbreath | |
| 2010/0325067 A1 | 12/2010 | Cagan | |
| 2011/0071969 A1 | 3/2011 | Doctor | |
| 2011/0078073 A1 | 3/2011 | Annappindi | |
| 2011/0112957 A1 | 5/2011 | Ingram | |
| 2011/0161263 A1 | 6/2011 | Lee | |
| 2011/0173116 A1 | 7/2011 | Yan | |
| 2011/0178902 A1 | 7/2011 | Imrey | |
| 2011/0184941 A1 | 7/2011 | El-Charif | |
| 2011/0320423 A1 | 12/2011 | Gemmell | |
| 2012/0053951 A1 | 3/2012 | Kowalchuk | |
| 2012/0059819 A1 | 3/2012 | Wheeler | |
| 2012/0066106 A1 | 3/2012 | Papadimitriou | |
| 2012/0066116 A1 | 3/2012 | Kornegay | |
| 2012/0072029 A1 | 3/2012 | Persaud | |
| 2012/0082476 A1 | 4/2012 | Ito | |
| 2012/0239613 A1 | 9/2012 | Danciu | |
| 2013/0091050 A1 | 4/2013 | Merrill | |
| 2013/0103569 A1 | 4/2013 | Gopinathan | |
| 2013/0138553 A1 | 5/2013 | Nikankin | |
| 2013/0185189 A1 | 7/2013 | Stewart | |
| 2014/0012794 A1 | 1/2014 | Dillon | |
| 2014/0014047 A1 | 1/2014 | Garcia | |
| 2014/0025872 A1 | 1/2014 | Flynn | |
| 2014/0052604 A9 | 2/2014 | Stewart | |
| 2014/0081832 A1 | 3/2014 | Merrill | |
| 2014/0108665 A1 | 4/2014 | Arora | |
| 2014/0122355 A1 | 5/2014 | Hardtke | |
| 2014/0149177 A1 | 5/2014 | Frank | |
| 2014/0172886 A1 | 6/2014 | Wilkes | |

(56) References Cited

U.S. PATENT DOCUMENTS

| | | |
|---|---|---|
| 2014/0180790 A1 | 6/2014 | Boal |
| 2014/0181267 A1 | 6/2014 | Wadkins |
| 2014/0310661 A1 | 10/2014 | Frederickson |
| 2014/0310681 A1 | 10/2014 | Poozhiyil |
| 2015/0019912 A1 | 1/2015 | Darling |
| 2015/0056229 A1 | 2/2015 | Nandy |
| 2015/0081602 A1 | 3/2015 | Talley |
| 2015/0161098 A1 | 6/2015 | Granshaw |
| 2015/0213361 A1 | 7/2015 | Gamon |
| 2015/0317337 A1 | 11/2015 | Edgar |
| 2015/0347485 A1 | 12/2015 | Cai |
| 2015/0379428 A1 | 12/2015 | Dirac |
| 2016/0042292 A1 | 2/2016 | Caplan |
| 2016/0088723 A1 | 3/2016 | Chung |
| 2016/0110353 A1 | 4/2016 | Merrill |
| 2016/0132787 A1 | 5/2016 | Drevo |
| 2016/0300252 A1 | 10/2016 | Frank |
| 2016/0371238 A1 | 12/2016 | Heavenrich |
| 2017/0061326 A1 | 3/2017 | Talathi |
| 2017/0109657 A1 | 4/2017 | Marcu |
| 2017/0124464 A1 | 5/2017 | Crabtree |
| 2017/0140518 A1 | 5/2017 | Liang |
| 2017/0220633 A1 | 8/2017 | Porath |
| 2017/0222960 A1 | 8/2017 | Agarwal |
| 2017/0316311 A1 | 11/2017 | Pilly |
| 2017/0330058 A1 | 11/2017 | Silberman |
| 2018/0018578 A1 | 1/2018 | Yoshizumi |
| 2018/0025273 A1 | 1/2018 | Jordan |
| 2018/0060738 A1 | 3/2018 | Achin |
| 2018/0068219 A1 | 3/2018 | Turner |
| 2018/0268262 A1 | 9/2018 | Osada |
| 2018/0293712 A1 | 10/2018 | Vogels |
| 2018/0322406 A1 | 11/2018 | Merrill |
| 2018/0349986 A1 | 12/2018 | Fidanza |
| 2019/0042887 A1 | 2/2019 | Nguyen |
| 2019/0043070 A1 | 2/2019 | Merrill |
| 2019/0114704 A1 | 4/2019 | Way |
| 2019/0228006 A1 | 7/2019 | Tormasov |
| 2019/0244122 A1 | 8/2019 | Li |
| 2019/0279111 A1 | 9/2019 | Merrill |
| 2019/0287025 A1 | 9/2019 | Perez |
| 2019/0303404 A1 | 10/2019 | Amer |
| 2019/0311298 A1 | 10/2019 | Kopp |
| 2019/0318202 A1 | 10/2019 | Zhao |
| 2019/0318421 A1 | 10/2019 | Lyonnet |
| 2019/0325514 A1 | 10/2019 | Hong |
| 2019/0340518 A1 | 11/2019 | Merrill |
| 2019/0340684 A1 | 11/2019 | Belanger |
| 2019/0354806 A1 | 11/2019 | Chhabra |
| 2019/0354853 A1 | 11/2019 | Zoldi |
| 2019/0378210 A1 | 12/2019 | Merrill |
| 2020/0005136 A1 | 1/2020 | Spryn |
| 2020/0012917 A1 | 1/2020 | Pham |
| 2020/0082299 A1* | 3/2020 | Vasconcelos .......... G06N 20/00 |
| 2020/0160177 A1 | 5/2020 | Durand |
| 2020/0175586 A1 | 6/2020 | McKenna |
| 2020/0183047 A1 | 6/2020 | Denli |
| 2020/0231466 A1 | 7/2020 | Lu |
| 2020/0242492 A1 | 7/2020 | Goel |
| 2020/0257927 A1 | 8/2020 | Nomi |
| 2020/0257961 A1 | 8/2020 | Hua |
| 2021/0019603 A1 | 1/2021 | Friedman |
| 2021/0133631 A1 | 5/2021 | Prendki |
| 2021/0209688 A1 | 7/2021 | Krishnamurthy |
| 2021/0224605 A1* | 7/2021 | Zhang .................... G06N 20/00 |
| 2021/0256392 A1 | 8/2021 | Zhengzhang |
| 2021/0281491 A1 | 9/2021 | Yelahanka Raghuprasad |
| 2021/0406815 A1* | 12/2021 | Mimassi .............. G06Q 20/102 |
| 2022/0019741 A1 | 1/2022 | Roy |
| 2022/0122171 A1* | 4/2022 | Hubard ................ G06Q 40/025 |
| 2022/0188519 A1 | 6/2022 | Briody |
| 2022/0188568 A1 | 6/2022 | Singh |
| 2022/0191332 A1 | 6/2022 | Ahmadi |

FOREIGN PATENT DOCUMENTS

| | | |
|---|---|---|
| WO | 2014121019 A1 | 8/2014 |
| WO | 2014184381 A2 | 11/2014 |
| WO | 2015056229 A1 | 4/2015 |
| WO | 2015081160 A1 | 6/2015 |
| WO | 2019028179 A1 | 2/2019 |

OTHER PUBLICATIONS

Merrill, John W. L., et al., "Generalized Integrated Gradients: A practical method for explaining diverse ensembles", Journal of Machine Learning Research Under Review (2019), 29 pages.

Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.

Gehrlein, W. et al., "A two-stage least cost credit scoring model", Annals of Operations Research, 1997, pp. 159-171 (abstract).

International Search Report issued in PCT/US2013/060208, dated Jan. 7, 2014, 2 pages.

Zhao, Zheng, et al., "On Similarity Preserving Feature Selection", IEEE Transactions on Knowledge and Data Engineering 25,2011, pp. 619-632.

Demaine, Erik D., et al., "Correlation clustering in general weighted graphs", Theorectical Computer Science 361 2006)172-187.

Ivanov, Alexei, et al., "Kolmogorov-Smirnov test for feature selection in emotion recognition from speech", IEEE International Conference on acoustics, speech and signal processing (ICASSP), 2012, pp. 5125-5128.

International Preliminary Report on Patentability issued in PCT/US2013/060208, dated Mar. 24, 2015, 8 pages.

Bit Array, Wikipedia Search, May 5, 2021 at https://en.wikipedia.org/wiki/Bit_array.

Genetic algorithm, Wikipedia Search, May 5, 2021 at https://en.wikipedia.org/wiki/Gentic_algorithm.

"Feature Selection" from Wikipedia and obtained in the Wayback machine at URL "https://en.wikipedia.org/wiki/Feature_selection" for Feb. 25, 2021.

"Feature Selection", Wikipedia and obtained in the Wayback machine at URL http://en.wikipedia.org/wiki/Feature_selection, Sep. 1, 2011.

Bittencourt, H.R. et al., "Feature Selection by Using Classification and Regression Trees (CART)", dated Aug. 23, 2004.

Strobl, Carolin, et al., "Conditional Variable Importance for Random Forests", BMC Bioinformatics 2008, 9:307, published Jul. 11, 2008.

Tuv, Eugene, et al., "Feature Selection with Ensembles, Artificial Variables, and Redundancy Elimination", Journal of Machine Learning Research, pp. 1341-1366, Jul. 2009.

"On the Convergence of Generalized Hill Climbing Algorithms" by A.W. Johnson et al. copyright 2002, Elsevier Science B.V., Discrete Applied Mathematics (Year: 2002).

Office Action (Non-Final Rejection) dated Dec. 16, 2021 for U.S. Appl. No. 15/977,105 (pp. 1-19).

International Search Report dated May 5, 2014 in corresponding PCT Application No. PCT/US2014/014047.

International Preliminary Report on Patentability dated Aug. 4, 2015 in corresponding PCT Application No. PCT/US2014/014047.

Office Action (Final Rejection) dated Dec. 7, 2021 for U.S. Appl. No. 16/109,545 (pp. 1-17).

International Search Report and the Written Opinion, Application No. PCT/US14/014047, dated May 5, 2014.

Office Action (Notice of Allowance and Fees Due (PTOL-85)) dated Nov. 19, 2021 for U.S. Appl. No. 16/292,844 (pp. 1-8).

Abadi, Martin, et al., "TensorFlow: Large-Scale Machine Learning on Heterogeneous Distributed Systems", Preliminary White Paper, Nov. 9, 2015.

Chen, Tianqi, et al., "XGBoost: A Scalable Tree Boosting System", KDD '16, Aug. 13-17, 2016, San Francisco, CA, USA.

Cortes, Corinna, et al., "Support-Vector Networks", AT&T Labs-Research, USA, Journal Machine Learning, vol. 20, Issue 3, Sep. 1995.

(56) References Cited

OTHER PUBLICATIONS

Friedman, Jerome H., "Greedy Function Approximation: A Gradient Boosting Machine", IMS 1999 Reitz Lecture, Feb. 24, 1999.
Garcia-Pedradas, Nicolas, et al., "Nonlinear Boosting Projections for Ensemble Contruction ", Journal of Machine Learning Research 8 (2007) 1-33.
Geurts, Pierre, et al., "Extremely randomized trees", Springer Science + Business Media, Inc., rec'd Jun. 14, 2005, pub. online Mar. 2, 2006.
Louppe, Gilles, et al., "Learning to Pivot with Adversarial Networks", 31st Conference on Neural Information Processing Systems (NIPS 2017), Long Beach, CA, USA, https://papers.nips.cc/paper/6699-learning-to-pivot-with-adversarial-networks.pdf.
Merrill, Douglas C, et al., "Systems and Methods for Decomposition of Non-Differentiable and Differentiable Models", U.S. Appl. No. 16/434,731, filed Jun. 7, 2019.
Merrill, Douglas C, et al., "Systems and Methods for Enriching Modeling Tools and Infrastructure with Semantics", U.S. Appl. No. 16/394,651, filed Apr. 25, 2019.
Rumelhart, David E., et al., "Learning representations by back-propagating errors", Nature vol. 323, Oct. 9, 1986.
Shapley, L. S., "A Value for n-Person Games", P-295, The Rand Corporation, Mar. 18, 1952.
Tonk, Stun, "Towards fairness in ML with adversarial networks", http://godatadriven.com/, Apr. 27, 2019.
Wolpert, David H., "Stacked Generalization", Original contribution: Stacked generalization. Neural Netw., 5(2):241 259, Feb. 1992.
"International Search Report and Written Opinion of the ISA, dated Sep. 16, 2019, for application No. PCT/US19/029148."
International Search Report and Written Opinion of the ISA, dated Aug. 23, 2019, for application No. PCT/ US19/036049.
Strumbelj, Eric, et al., "An Efficient Explanation of Individual Classifications using Game Theory", Journal of Machine Learning Research 11 (2010) 1-18.
International Search Report and Written Opinion of the ISA, dated Jul. 5, 2019, for application No. PCT/US19/021381.
Breiman, Leo, et al., "Random Forests", Machine Learning, 45, 5-32, 2001.
Kamkar, Sean Javad, "Mesh Adaption Strategies for Vortex-Dominated Flows", Standard University, Feb. 2011.
Lundberg, Scott M., et al., "A Unified Approach to Interpreting Model Predictions", 31st Conference on Neural Information Processing Systems (NIPS 2017), Long Beach, CA, USA, Nov. 25, 2017.
Lundberg, Scott M., et al., "Consistent Individualized Feature Attribution for Tree Ensembles", University of Washington, Mar. 7, 2019.
Modarres, Ceena, et al., "Towards Explainable Deep Learning for Credit Lending: A Case Study", arXiv:1811.06471v2 [cs.LG], Nov. 30, 2018.
Richardson, L. F., "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.
Richardson, L. F., "The deferred approach to the limit", Philosophical Transactions of the Royal Society A. 226 (636-646): 299-349. doi:10.1098/rsta.1927.0008, Oct. 14, 1926.
Saabas, Ando, "Diving into data, a blog on machine learning, data mining and visualization, Interpreting random forests", http://blog.datadive.net/interpreting-random-forests/ (spec), Oct. 19, 2014.
Saabas, Ando, "Diving into data, a blog on machine learning, data mining and visualization, Random forest interpretation—conditional feature contributions", http://blog.datadive.net/random-forest-interpretation-conditional-feature-contributions/ (spec), Oct. 26, 2016.
Saabas, Ando, "Diving into data, a blog on machine learning, data mining and visualization, Random forest interpretation with scikit-learn", http://blog.datadive.net/random-forest-interpretation-with-scikit-learn/ (spec), Aug. 12, 2015.

Sundararajan, Mukund, et al., "Axiomatic Attribution for Deep Networks", Proceeding of the 34th International Conference on Machine Learning, Sydney, Australia, PMLR 70, Jun. 13, 2017.
International Search Report and Written Opinion for International Application No. PCT/US18/030966, dated Jul. 20, 2018.
International Search Report and Written Opinion for Application No. PCT/US18/44874, dated Oct. 10, 2018.
Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 (Year: 2018).
Chen, Jiahao, Fair lending needs explainable models for responsible recommendation Proceedings of the Second Workshop on Responsible Recommendation, 2018 (Year: 2018).
Ribeiro, Marco Tulio et al., Why Should I Trust You?—Explaining Predictions of Any Classifier ACM, 2016 (Year: 2016).
Gates, Susan Wharton et al., ⅓ Automated Underwriting: Friend or Foe to Low-Mod Households and Neighborhoods? Building Assets, Building Credit, Symposium, Nov. 2003 (Year: 2003).
Wattenber, Martin et al., Attacking discrimination with smarter machine learning Google Research, 2016 (Year: 2016).
Data Bias and Algorithmic Discrimination University of Montreal, 2017 (Year: 2017).
Office Action (Final Rejection) dated Nov. 18, 2021 for U.S. Appl. No. 16/052,293 (pp. 1-18).
International Search Report and Written Opinion for application No. PCT/US20/062235, dated Mar. 10, 2021.
International Search Report and Written Opinion of the ISA for application No. PCT/20/23370 dated Jun. 18, 2020.
Johnson, Kristen, et al., "Artificial Intelligence, Machine Learning, and Bias in Finance: Toward Responsible Innovation", Fordham Law Review, vol. **, Issue 2, Article 5,2019, pp. 499-529.
Lippert, John, "ZestFinance Issues small, high-rate loans, uses big data to weed out deadbeats", The Washington Post, Oct. 12, 2014.
Nesiba, Reynold F, "The Color of Credit: Mortgage Discrimination, Research Methodology, and Fair-Lending Enforcement", Journal of Economic Issues, 37 (3), 813-815, 2003.
ZestFinance releases new software tool to reduce bias in AI-powered credit scoring models: New fairness filter can put 170,000 more minority families into homes. (Mar. 19, 2019). PR Newswire Retrieved from https://dialog.proquest.com/professional/docview/2193594346?accountid=131444 (Year: 2019).
International Search Report and Written Opinion for application No. PCT/US20/062271 dated Feb. 26, 2021.
International Search Report and Written Opinion issued in PCT/US2020/062235, dated Mar. 10, 2021, 8 pages.
International Search Report and Written Opinion issued in PCT/US2020/062271, dated Feb. 26, 2021, 8 pages.
Office Action (Non-Final Rejection) dated Mar. 2, 2022 for U.S. Appl. No. 16/434,731 (pp. 1-6).
Boris Sharchilev et al: "Finding Influential Training Samples for Gradient Boosted Decision Trees", arxiv.org, Cornell University Library, 201 Olin Library Cornell University Ithaca, NY 14853, Feb. 19, 2018 (Feb. 19, 2018), XP081223129, 10 pages.
European Extended Search Report issued in EP19764112.9, dated Jun. 27, 2022, 11 pages.
European Extended Search Report issued in EP19764112.9, dated Mar. 24, 2022, 14 pages.
Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019. 8759110, 8 pages (Year: 2019).
Marco Ancona et al: "Towards better understanding of gradient-based attribution methods for Deep Neural Networks", arxiv.org, Cornell University Library, 201 Olin Library Cornell University Ithaca, NY 14853, Mar. 7, 2018 (Mar. 7, 2018), XP081506780, 16 pages.
Mukund Sundararajan et al: "Axiomatic Attribution for Deep Networks", arxiv.org, Cornell University Library, 201 Olin Library Cornell University Ithaca, NY 14853, Mar. 4, 2017 (Mar. 4, 2017), XP080754192, 10 pages.

(56) References Cited

OTHER PUBLICATIONS

Office Action (Non-Final Rejection) dated May 24, 2022 for U.S. Appl. No. 16/688,789 (pp. 1-17).
Office Action (Non-Final Rejection) dated Jun. 24, 2022 for U.S. Appl. No. 17/385,452 (pp. 1-14).
Wikipedia entry on "Autoencoder". https://en.wikipedia.org/wiki/Autoencoder Downloaded Jun. 15, 2022 (Year: 2022).
Dong Yue et al, "Threaded ensembles of autoencoders for stream learning : Neural Networks for Stream Learning", Computational Intelligence, vol. 34, No. 1, doi:10.1111/coin.12146, ISSN 0824-7935, (Feb. 1, 2018), pp. 261-281, URL: https://api.wiley.com/onlinelibrary/tdm/v1/articles/10.1111%2Fcoin.12146, XP055925516 (Absract).
European Extended Search Report issued in EP19796824.1, dated Jun. 13, 2022, 9 pages.
International Preliminary Report on Patentability in International Appln. No. PCT/US2019/029148, dated Nov. 19, 2020, 6 pages.
Li, Hongxiang, et al. "A novel method for credit scoring based on feature transformation and ensemble model." PeerJ Computer Science 7 (2021): e579. 19 pages.
Office Action (Final Rejection) dated Dec. 7, 2022 for U.S. Appl. No. 16/688,789 (pp. 1-24).
Office Action (Non-Final Rejection) dated Oct. 28, 2022 for U.S. Appl. No. 17/389,789 (pp. 1-19).
Office Action (Non-Final Rejection) dated Dec. 8, 2022 for U.S. Appl. No. 17/147,025 (pp. 1-20).
Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.
Sean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.
Office Action (Final Rejection) dated Aug. 16, 2022 for U.S. Appl. No. 15/977,105 (pp. 1-17).
Office Action (Non-Final Rejection) dated Aug. 1, 2022 for U.S. Appl. No. 16/052,293 (pp. 1-15).
Office Action (Non-Final Rejection) dated Aug. 26, 2022 for U.S. Appl. No. 16/394,651 (pp. 1-8).
Office Action (Non-Final Rejection) dated Sep. 22, 2022 for U.S. Appl. No. 17/223,698 (pp. 1-8).
Zhao, Q., Li, Q. and Wen, J., 2018 Construction and application research of knowledge graph in aviation risk field. In MATEC Web of Conferences (vol. 151, p. 05003). EDP Sciences.

* cited by examiner

S320

Define a custom loss function that is a combination of a tree ensemble loss function and one or more adversarial classifier loss functions S321

For each training data row, compute a gradient value and a hessian value using the custom loss function S322

Generating a new tree model by using the computed gradient and hessian values S323

Record model training information S324

SYSTEMS AND METHODS FOR GENERATING GRADIENT-BOOSTED MODELS WITH IMPROVED FAIRNESS

TECHNICAL FIELD

This disclosed systems and methods relate generally to a modeling system field, and more specifically to a new and useful model training system in the modeling system field.

BACKGROUND

There is a need in the modeling system field to improve fairness in predictive models. In the field of credit risk modeling, where machine learning models are used to decide whether a consumer should be given a loan, it is particularly important that the lending decision be fair with respect to race and ethnicity, gender, age, and other protected attributes, that sources of disparate impact be identified, and either neutralized or justified. The Equal Credit Opportunity Act (ECOA), a United States law (codified at 15 U.S.C. § 1691 et seq.), enacted 28 Oct. 1974, provides a process to ensure fair credit decisions, and is incorporated by reference. Embodiments disclosed herein enable new and useful methods for creating more fair models, in general, and in particular, to create credit risk models in compliance with laws and regulations such as ECOA.

BRIEF DESCRIPTION OF THE FIGURES

FIG. 3B is a schematic representation of an example training a new tree sub-model.

DESCRIPTION OF THE PREFERRED EMBODIMENTS

Figure 1A:
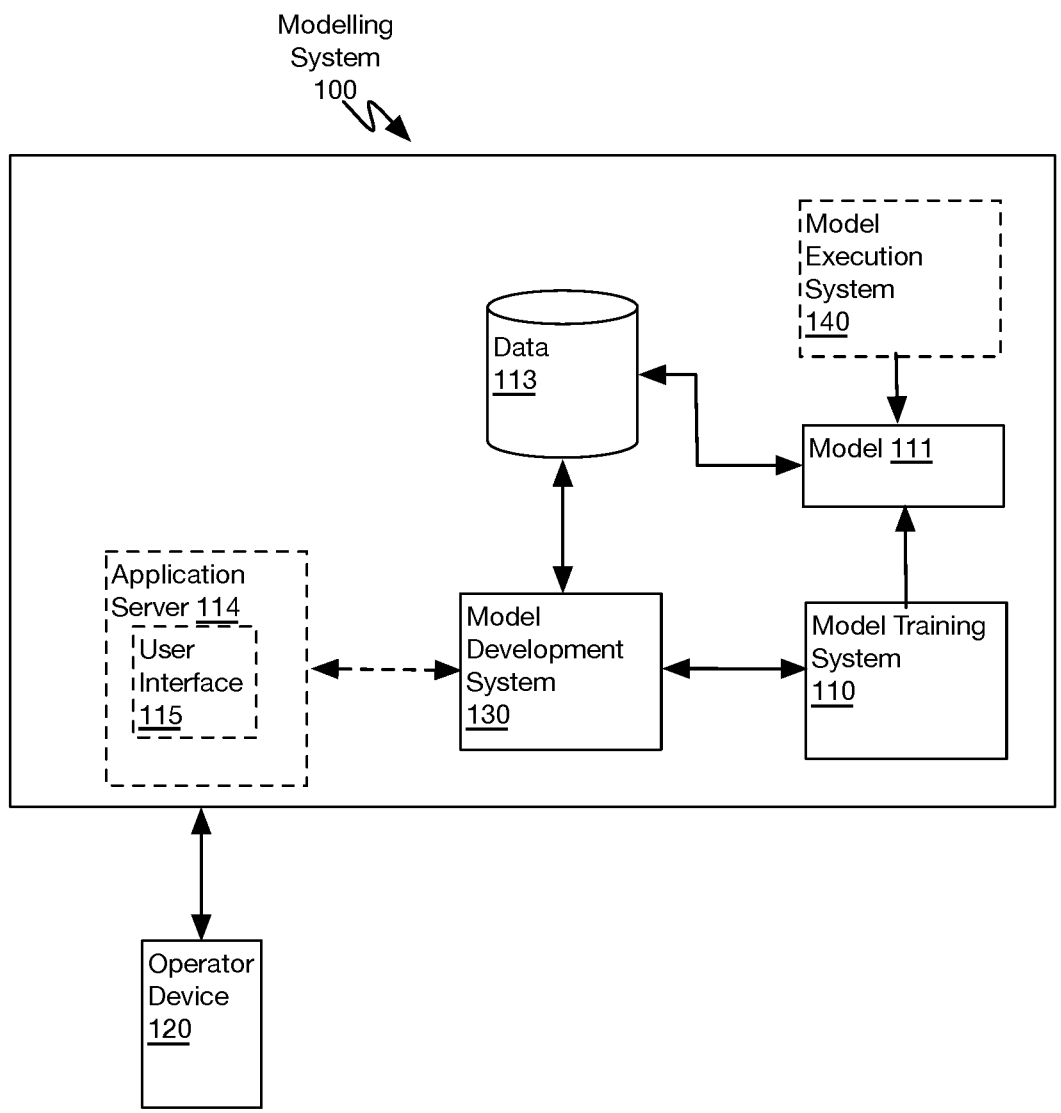
FIG. 1A is a schematic representation of an example modeling system.
Figure 1B:
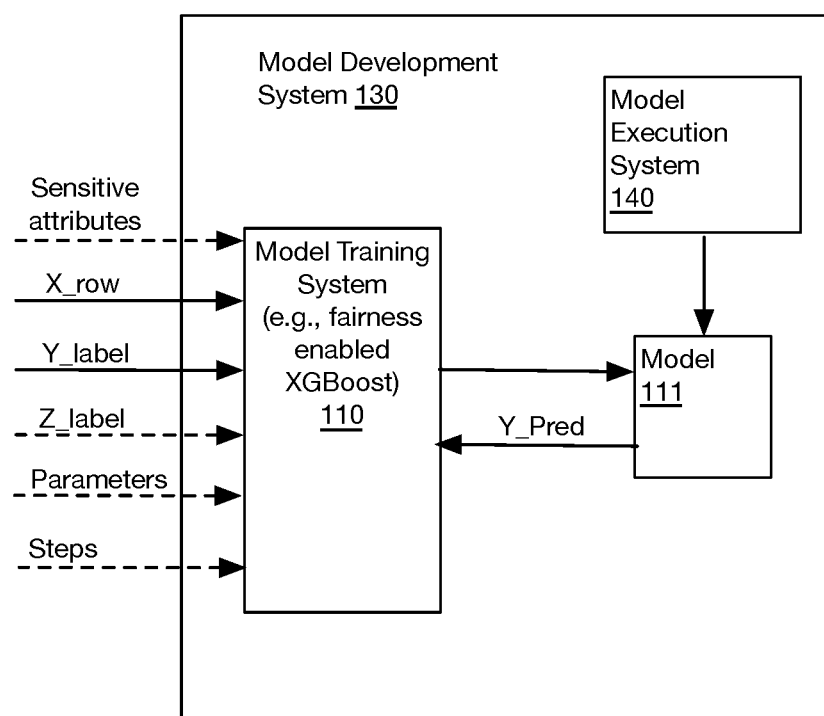
FIG. 1B is a schematic representation of an example model development system included in a modeling system.

The following description of the preferred embodiments is not intended to limit the disclosure to these preferred embodiments, but rather to enable a person of ordinary skill in the art to make and use such embodiments.

In determining whether to deploy a model (e.g., a predictive model) in a real-world scenario that impacts people's lives, fairness in how such a model impacts people's lives can be a consideration in determining whether to deploy the model, or continue model development. For example, whether a model favors a certain class of people (e.g., a class based on race, ethnicity, age, sex, national origin, sexual orientation, demographics, military status, etc.) over other classes of people may be a consideration in determining whether to deploy the model.

Fairness can also be a concern in deciding whether to deploy models that do not directly impact people's lives, or that do not affect people's lives at all. For example, for a predictive model that predicts a value related to the efficacy of various drugs, it might be desired to train the model such that it does not favor drugs produced by a specific manufacturer. Several other examples exist in which it is useful to train a model to be fair with respect to a certain class of outcomes or attributes.

Similarly, in many cases, it is desirable to train a model such that it produces predictions that result in similar outcomes for a plurality of segments identified based on a sensitive attribute. Embodiments herein address the foregoing by providing new and useful systems and methods of generating and/or training models.

In variants, the method disclosed herein functions to generate a prediction system that outputs one or more predictions based on received data (sometimes called predictive variables, model features, or independent variables), in a manner that produces similar outcomes with respect to different sensitive attributes. The method disclosed herein enables model developers to generate predictive models that result in fairer outcomes with respect to sensitive attributes without including the sensitive attribute as an input to the model. Such a method is desirable when model developers are prohibited from including a sensitive attribute as a model input variable, but seek to improve outcomes from decisions made based on a model's prediction with respect to a sensitive attribute. For example, in the United States, it is prohibited for lenders to consider protected class membership status when deciding whether to grant a loan to a consumer, but the law compels lenders to seek demographic parity with respect to outcomes across protected and non-protected classes, e.g., female and male credit applicants.

Fairness of the prediction system can be identified based on a measured difference in outcomes for decisions based on the model for each value of a sensitive attribute. For example, if the prediction system is designed to predict the probability of default for a consumer loan, the outcomes (approval rate for loans, for example) should be similar for each race and ethnicity (or other sensitive attributes) of a credit applicant. Outcomes can include a approve/deny decision and an approval rate, but may also include loan terms (APR, down payment amount required) and indeed, any suitable and measurable outcome. The default predictions (and more generally, predictions) generated by the prediction system should be invariant to race (or at least below a threshold value for a metric that identifies the impact of race to credit scores generated by the prediction system). In many cases, a model developer seeks to explore model variations that maximize one outcome (e.g., predictive accuracy of the model) and another (e.g., parity of outcomes with respect to sensitive attributes). The embodiments disclosed herein provide model developers with a practical method for generating models that maximize both outcomes, such that optimal tradeoffs between the multiple outcomes can be identified (e.g., maximizing fairness and accuracy), resulting in an efficient frontier of model alternatives.

If a value for a sensitive attribute can be accurately predicted based on the output generated by the prediction system, then the prediction system most likely fails to satisfy fairness constraints defined for the prediction system. If values for a sensitive attribute (e.g., the borrower's race and ethnicity, age, gender, etc.) can be predicted by a second model based solely on the outputs from the prediction system, this implies that the outputs of the prediction system preferentially favor applicants with certain sensitive attributes over others, e.g., males over females, whites over African Americans. In other words, even if values for these sensitive attributes are not provided to the prediction system as inputs, the outputs of the prediction system may still be correlated with specific sensitive attributes.

Since the outputs of the prediction system are used to provide benefits or opportunities to users of such systems, this correlation can act to cause harm to members of those sensitive groups. For example, if a credit model scores most African American applicants as more likely to default on their loan than White, Non-Hispanic applicants, it is possible to predict whether an applicant is African American or White, Non-Hispanic, based solely on the model score with a measurable degree of accuracy. However, if values for sensitive attributes cannot be accurately predicted based on the output of the prediction system, then it is unlikely that the prediction system can derive such values based on the inputs it receives, and thus the prediction system can be deemed to be fair with respect to the sensitive attribute (to a measurable degree).

The method disclosed herein may include at least one of: selecting sensitive attributes; and generating a prediction system (e.g., a tree-based predictive model) that maximizes a fairness metric for the sensitive attributes while simultaneously maximizing some other objective, such as classification accuracy. In some embodiments, the method includes selecting a fairness metric. In some embodiments, the fairness metric may include at least one of: parity of outcomes, equal odds, or a metric based on the frequency of occurrence of sensitive attribute values in a population. In some embodiments, the selection of sensitive attributes is performed by a user selecting a sensitive attribute via a user interface.

Generating the prediction system includes training a model to maximize one objective, e.g., predictive accuracy (as measured by the F statistic, AUC, max K-S, Gini coefficient, and the like) and training a tree-based predictive model by using a fairness-enabled tree-based boosting module. Such a fairness-enabled tree-based boosting module can include a boosting module (e.g., AdaBoost, XGBoost, Catboost, LightGBM, etc.) that includes a custom loss function module described in detail herein, that is constructed to train tree-based models to incorporate a fairness metric that considers outcomes for at least one value of a sensitive attribute and the predictive performance (loss, as characterized by mean squared-error, log-loss, and the like) with respect to known outcomes for the model's predictive target (e.g., delinquent for 90 days, charge-off, and the like).

The custom loss function module may include at least one model that attempts to predict the value of at least one sensitive attribute value based on a fairness-enabled model output. The custom loss function module receives (as input) predictions for input rows corresponding to the model outputs ($Y_{pred}$), and corresponding ground truth labels containing the actual outcomes ($Y_{label}$). The predictions are outputs of the prediction model, and the labels are the actual values that should be predicted by a perfectly accurate prediction model. Accuracy of the prediction model can be identified by comparing the prediction for a row with the corresponding label.

For each selected sensitive attribute, the custom loss function module also receives (for each selected sensitive attribute) a sensitive attribute label for each received prediction ($Z_{label}$). Using the received predictions and the received sensitive attribute labels for a sensitive attribute, the custom loss function module can define a metric that identifies the accuracy of predicting a sensitive attribute value (for the sensitive attribute) from predictions generated by the prediction model. Using this metric, the custom loss function module computes information to guide the iterative solution employed by the tree-based boosting-solution procedure, which is often based on the computation of a gradient and/or Hessian. In some embodiments, the custom loss function module includes a predictive model that is trained simultaneously with the prediction model based on sensitive attribute values and the prediction model outputs.

The trained tree-based predictive model is selected and either used in production or provided to a system (e.g., via the user interface, API, or network interface). Model explanation information can optionally be generated for the trained tree-based predictive model. A fairness penalty parameter can be configured to control the degree of importance that the fairness objective carries during the model training process. This permits the fairness-enabled tree-based boosting module to generate a range of models, each resulting from a different fairness penalty value. One or more of the trained tree-based predictive models can be analyzed to project business outcomes (including measures of profitability and fairness with respect to a sensitive attribute) and selected for use in production. In embodiments, the system generates compliance documentation reflecting the search process and properties of the selected model. In embodiments, the selected model is deployed for production use based on the invocation of an API.

In some embodiments, reports justifying the selection of a trained model (generated by using the fairness-enabled tree-based boosting module) for use in production can be automatically generated. Reports can be automatically generated by performing one or more of the methods described in one or more of: U.S. patent application Ser. No. 16/394,651 ("SYSTEMS AND METHODS FOR ENRICHING MODELING TOOLS AND INFRASTRUCTURE WITH SEMANTICS"), filed 25 Apr. 2019, and U.S. Provisional Patent Application No. 62/940,113 ("SYSTEMS AND METHODS FOR AUTOMATIC MODEL GENERATION"), filed 25 Nov. 2019, the contents of which are each hereby incorporated by reference herein.

An operator device user interface can display fairness metrics, accuracy metrics, and economic projections for trained models, and the user interface can receive user input for parameters used during training by the fairness-enabled tree-based boosting module. In some variations, a Software As A Service (SAAS) platform is provided that allows an operator to use the fairness-enabled tree-based boosting module to generate a trained tree-based model that meets specified fairness and accuracy constraints. In some variations, the system generates reports describing the training process, the resulting model, and model analysis and comparisons such as: showing the difference in fairness and accuracy between an original model and a more fair alternative, the importance of each input variable in the original model and the more fair model, the projected business outcomes from adopting the model (e.g., approval rate, default rate, profitability) and other comparisons and analyses related to the original model and fair alternatives.

In some implementations, feature importance and other descriptive information, e.g., disparate impact, disparate treatment, or key factor reason codes necessary for providing adverse action notices for credit systems, can be generated by performing a generalized integrated gradients decomposition method, such as one or more of the methods described in U.S. Application Publication No. US-2020-0265336 ("SYSTEMS AND METHODS FOR DECOMPO- SITION OF DIFFERENTIABLE AND NON-DIFFERENTIABLE MODELS"), filed 19 Nov. 2019, the contents of which is incorporated by reference herein.

The model training techniques described herein can be applied to models used to make predictions in which fairness is a factor for deciding whether to permit the model for use in production. The embodiments herein can be applied to predictive models for use in decisions related to: retail and commercial credit lending, residential leasing, insurance applications, hiring, employment, fraud detection, admissions (e.g., school admissions), scholarship awards, advertising, home sales, drug testing, scientific research, medical results analysis, and the like.

Various systems are disclosed herein. In some variations, the system can be any suitable type of system that uses one or more of artificial intelligence (AI), machine learning, predictive models, and the like. Example systems include credit systems, drug evaluation systems, college admissions systems, human resources systems, applicant screening systems, surveillance systems, law enforcement systems, military systems, military targeting systems, advertising systems, customer support systems, call center systems, payment systems, procurement systems, and the like. In some variations, the system functions to train one or more models to predict an outcome. In some variations, the system functions to use one or more models to generate an output that can be used to make a decision, populate a report, trigger an action, and the like.

In variations, the system is a modeling system. The system can be a local (e.g., on-premises) system, a cloud-based system, or any combination of local and cloud-based systems. The system can be a single-tenant system, a multi-tenant system, or a combination of single-tenant and multi-tenant components.

In some variations, the system (e.g., 100) (or a component of the system, e.g., the model training system 110) can be an on-premises modeling system, a cloud-based modeling system, or any combination of on-premises and cloud-based components.

The system 100 can include a model development system 130. The system 100 optionally includes one or more of a model execution system 140, and a model training system 110.

The model development system 130 functions to generate a model using machine learning techniques to predict an outcome. In variants, the model development system 130 can prepare, build, explain, verify, publish, and monitor machine learning models. In some implementations, the model development system includes the model training system 110, and the model development system 130 uses the model training system 110 to generate a model.

The model training system 110 functions to automatically train a model that predicts a value for a selected target feature (or variable) given a set of related input values (e.g., input values included in a row of data that is to be evaluated or scored). For example, given input row X, the model F(X) predicts a value for a target Y. In variants the value for target Y represents a probability or likelihood of an outcome. In variants, the model training system 110 receives, as input, training data that includes several rows $x_i$ and corresponding labels $y_i$. Each label $y_i$ represents a value that is to be predicted by the model F(X).

The model training system 110 optionally receives one or more model training parameters as inputs as well. In variants, the model training system receives (as input), selection of a type of model that is to be trained (e.g., tree model, a logistic regression model, a perceptron, neural network, a feed-forward neural network, an autoencoder, a probabilistic network, a convolutional neural network, a radial basis function network, a multilayer perceptron, a deep neural network, a recurrent neural network, and/or a suitable type of differentiable or non-differentiable model). Example neural networks can include: Boltzman machines, echo state networks, long short-term memory (LSTM), hierarchical neural networks, stochastic neural networks, and other suitable types of differentiable neural networks. However, any suitable type of model can be selected to be trained.

In variants, the model training system 110 functions to fit the selected model to the training data and output a trained model that is able to predict a target value based on an input training data row.

For example, model training system 110 can access training input that includes: model training parameters, a model type selection, and training data that includes input rows and target labels. The model training system 110 can access this input from one or more of a network interface, a user interface (e.g., provided by an application server, etc.), an application programming interface (API), and/or a storage device. After accessing this information, the model training system can instantiate a model of the selected model type, automatically train the model to fit the training data (by executing a training function that accepts as input the training data and the optional training parameters).

The output of the training function is a trained version of the model. A prediction function of the trained model can be executed to output a prediction for a given input row that is passed as an input to the prediction function.

In variants, the model training system 110 can evaluate the trained model by executing the model's prediction function for each of a plurality of rows of test data. Each prediction for a test data row is then compared with a corresponding target label that identifies the true value that should be predicted by the model for the test data row. An evaluation metric (e.g., an accuracy metric) is computed for the model based on the results of the comparisons.

In variants, the model training system 110 is a tree boosting module (e.g., Adaboost, XGBoost, Catboost, LightGBM, etc.).

In variants, the model training system 110 is a fairness-enabled model training system that functions to iteratively adjust the model (during model training) to improve fairness of the model with respect to as least one selected sensitive attribute (e.g., race, sex, etc.), in addition to improving the accuracy of the model. In variants, sensitive attributes include features whose values are excluded from the training data, but can possibly be inferred by analyzing the training data.

In some variations, the fairness-enabled model training system is a fairness-enabled tree-based boosting module. In some variations, the fairness-enabled tree-based boosting module includes a tree boosting module (e.g., AdaBoost, XGBoost, Catboost, LightGBM, etc.) that includes a custom loss function module that is constructed to train tree-based models to satisfy fairness criteria for the selected features (sensitive attributes).

The model execution system 140 functions to execute the prediction function of the trained model to generate output values for one or more input rows of data.

In some variations, the model execution system 140 functions to perform at least one of: publishing of trained models; verification of trained models; execution of trained models; and monitoring of trained models.

In variants, the modeling system 100 includes tools that utilize a semantic layer that stores and provides data about variables, features, models and the modeling process. In variants, the semantic layer is a knowledge graph stored in a repository. In variants, the repository is a storage system. In variants, the repository is included in a storage medium. In variants, the storage system is a database or filesystem and the storage medium is a hard drive.

In some variations, the model training system 110 includes a training set selector that selects training data based on data received from the adversarial classifier 112. In some implementations, the training set selector removes attributes from the training set based on information received from the adversarial classifier (e.g., information identifying a prediction accuracy of the adversarial classifier for the removed attribute). In some implementations, the training set selector includes one or more rules that are used by the training selector to remove attributes from the training data sets based on the information received from the adversarial classifier. For example, if the adversarial classifier can accurately predict a value of a sensitive attribute from an output generated by the model, the model training system can remove the sensitive attribute from the training data used to train the model (e.g., 111).

A sensitive attribute can be a feature that identifies a class of individuals (e.g., a class based on race, ethnicity, age, sex, national origin, sexual orientation, demographics, military status, etc.), a manufacturer of a product, or any type of suitable information that should not affect output (e.g., a prediction) generated by the model. In some variations, a sensitive attribute is not an input feature to the model (e.g., as is required, for example in fair lending applications wherein the applicant's protected class membership status is prohibited from being included as a model input variable). In some variations, the systems and methods disclosed herein provide a way to make the model more fair under the conditions required by ECOA and other fair lending regulations and guidance.

In some variations, the fairness-enabled model training system (e.g., 110) trains the model on a subset of training rows, and then invokes the model (e.g., executes a prediction function) to produce a score for each training row, each score being evaluated by one or many adversarial classifiers each designed to predict a sensitive attribute or combination of sensitive attributes based on the model's score. In some variations, the adversarial classifiers predict a sensitive attribute based on the model score. In some variations, the adversarial classifiers are trained simultaneously with the model; the adversarial classifier is trained based on the model's score and a known sensitive attribute value, each corresponding to the same row used to generate the score from the model.

In some variations, the error rate of the adversarial classifier is combined in the objective function of the model after the initial training epoch, prior to updating the model (through back propagation, gradient boosting, or other means), and the process continues by selecting successive samples of training data, training the model, and training the adversarial classifier as described, until the training data is exhausted. In some variations, the objective function in the model is a linear combination of the output of the model's original objective function and the error rate of the adversarial classifier(s). In some variations there is an adversarial classifier for each sensitive attribute. In other variations, there is one adversarial classifier predicting a binary flag representing all the sensitive attributes. In other variations, the loss from one or more adversarial classifiers is transformed or scaled based on the frequency of occurrence of a sensitive attribute within a population for sensitive attributes associated with each row prior to performing the gradient update or gradient boosting steps.

In some variations, the system 100 functions to produce a series of more fair alternative models by adjusting the model's overall objective, which can be a linear (or otherwise) combination of the loss functions associated with predictive accuracy, e.g., default risk, and fairness, e.g., score disparity between protected classes and their unprotected class counterparts. In some variations, the number of versions of the model to be generated and the linear combination parameters are selected based on user input received from a user via a graphical user interface. In some variations, each version of the model is analyzed, and reports are generated to help a user determine whether each model produces stable results over time, produces the desired business results, and is otherwise suitable for use in production. In some variations, the best model is selected using predefined selection criteria based on attributes of the model and the business problem. In some examples, the best model is selected by comparing the fairness and accuracy metrics associated with each of the fair alternative models with the fairness and accuracy metrics associated with a benchmark model. In examples, the benchmark model is the model the lender is already using to make credit decisions. In other variations the benchmark model is a national score or industry score such as a FICO® score, Vantage® Score, or FICO® Auto Score. In some variations, the best alternative model is the model with the highest accuracy metric that achieves at fairness metric greater than or equal to the benchmark model. In examples, the less discriminatory alternative model selection process is performed automatically by a modeling system and automatically documented in corresponding model documentation. In other examples, the model is selected by indication of a user based on metrics related to the models contained in reports or displayed in a graphical user interface.

In variations, the selected less discriminatory alternative model estimates the probability a loan will be repaid. The system deploys the model to production where it is made available for use in a decisioning system. In some examples the system packages the model scoring function, explainer, and dependencies in a Docker container, and exposes the scoring function via a web service that returns scores and adverse action reason codes based on Shapley values. In other variations, the adverse action reason codes are based on generalized integrated gradients values. Once the model is deployed, the decisioning system provides loan application data, including credit data, to the less discriminatory alternative model. In variations, the decisioning system provides inputs to the less discriminatory alternative model via webservice APIs, for example as described in U.S. Pat. No. 10,127,240, the contents of which are incorporated herein by reference.

The less discriminatory alternative model receives the loan application data and produces a score corresponding to the likelihood the loan will be repaid. In variations, the less discriminatory alternative model provides model explanations and adverse action reason codes to the decisioning system along with each score. If the loan is denied based on the less discriminatory alternative model score, the decisioning system causes an adverse action letter to be generated, printed, and sent to the person applying for a loan. In variations, the adverse action letter contains natural language statements of specific reason based on explanations of the less discriminatory alternative model's score. In some variations the adverse action reasons are based on the explanation methods described in U.S. patent application Ser. Nos. 16/109,545, 15/970,626, 16/297,099, 16/434,731, or 16/688,789, the contents of which are incorporated herein by reference. In variations, the adverse action mailings (postal and/or electronic) are orchestrated by creating a database of variable values and sending a mail merge print and drop job order to a direct mail or bulk mail vendor system. In this way, the underwriting decisions made by financial institutions granting loans to consumers and businesses can be made fairer, and greater demographic parity of outcomes can be achieved.

In variations, the selected less discriminatory alternative model estimates the value of a home and is deployed to production where it is made available for use in a decisioning system. The less discriminatory alternative house value estimation model is trained to minimize the difference in error between homes in majority minority neighborhoods and majority white neighborhoods. The decisioning system provides attributes of the property to the model. For example, the attributes may include lot size, number of stories, number of bedrooms, number of bathrooms, whether the property has central air conditioning, and the like. The decisioning system receives the estimated value of the asset from the less discriminatory alternative value estimation model, in order to compute at least one attribute of a loan for use by an underwriting model.

In variations, the asset value estimated by the less discriminatory alternative model is used to compute a loan to value ratio of a secured loan. In other variations the loan to value ratio is computed for a mortgage loan. An underwriting model or decisioning system then makes the decision of whether to grant or deny a loan application based on the loan to value ratio. In other embodiments, an underwriting model provides a risk assessment to an originator based on the estimated value. In examples, the variables used in the model, fair lending metrics and error rates disaggregated by protected class membership status are automatically documented in a report associated with the model. In this way, the value estimates used in underwriting secured loans for consumers seeking to purchase or refinance a home can be made fairer, and the models used to estimate them rendered more transparent. Because value estimates are based on a less discriminatory alterative value estimation model, the error associated with value estimates associated with majority minority neighborhoods and white neighborhoods can be made more equal.

In other variations, the less discriminatory alternative model is a credit line assignment model. In examples, the model is used to decrease the credit line amount associated with a credit card account when the likelihood of a deep delinquency is above a threshold as predicted by the model. In this example, the less discriminatory alternative model is trained to predict the likelihood of a deep delinquency based on variables such as past balance, credit attributes such as recent inquiries, delinquencies, payment pattern, or utilization, and transaction data related to the credit card account, such as the percentage of limit spent by merchant category and the rate of change of the sum of transaction amounts by category over time. In examples, the rate of change of transaction amounts by category is used as a predictive variable, e.g., the rate of change of the percentage of limit used on merchant categories such as groceries, gas, restaurants, etc. The less discriminatory alternative model may be iteratively trained with an adversary that predicts the likelihood a card holder has a sensitive attribute given the likelihood of a delinquency as predicted by the alternative model.

In variations, in production, an account management or loan management system generates a file of open accounts. The system retrieves credit reports and transaction histories associated with those accounts, which are then transmitted to a batch scoring system. The batch scoring system sends information related to each account to the less discriminatory alternative line assignment model, which assigns a likelihood of a deep delinquency to each account. Adverse action reason codes for the less discriminatory alternative line assignment model score may be computed based on Shapley values, SHAP values, integrated gradients, generalized integrated gradients, or other attribution methods such as those described in U.S. patent application Ser. Nos. 16/109,545, 15/970,626, 16/297,099, 16/434,731, or 16/688,789, which are incorporated by reference.

In variations the line assignment model is a classifier that predicts the likelihood of a deep delinquency given credit attributes and a line amount. In variations the line assignment model is a regressor that predicts the balance on the account at some time in the future, combined with a likelihood of a deep delinquency at that same point in the future and each model is trained using the less discriminatory alternative model search process described herein. An identifier corresponding to a revolving credit account such as a credit card account, the model score and reason codes associated with the model score for that account, are appended to a results file which is made available to the loan management system. The loan management system receives the results file and applies line decreases to accounts based on a series of policies.

In variations, the policies include exclusion rules such as: exclude accounts that have had a line decrease in the past X days (e.g., 90 days), or exclude accounts that correspond to principals of businesses that have business loans with the bank, and so on. In variations, policies also include a rule based on the line assignment model score, for example, if the likelihood of a deep delinquency is greater than a threshold, apply the line decrease. In some variations the policies include a rule based on the loss amount, for example if the risk-adjusted loss amount exceeds a dollar threshold, apply a line decrease. When the line decrease is based on the model score, the loan management system will cause an adverse action letter to be printed out and mailed to the account holder. The adverse action letter preferably contains the new credit line amount based on the line assignment, and a statement of the specific reasons for the line decrease. When the line decrease is based on the model score, the reasons in the adverse action letter correspond to the reasons included in the results file (e.g., based on the previously computed reasons associated with the less discriminatory alternative line assignment model score in the results file). In variations, when the consumer receives the notice of credit line decrease, the reasons for the line decrease are recorded in a customer relationship management system so that if the customer calls to complain, call center operators have the information they need to explain why the consumer received the line decrease.

In some variations, the method of optimizing models for multiple objectives (as described above, for fairness and accuracy) is used to ensure greater parity of outcomes in other multi-objective optimization problems. For example, ecommerce businesses often have multiple suppliers, where each supplier provide different products that are sold on the ecommerce company's website. Often, ecommerce websites have product recommendation features that recommend products to consumers browsing an ecommerce website. For example, Amazon.com displays a carousel of "Products related to this item" on every product listing page. Ecommerce business operators seek to recommend products that will yield the greatest profit for their business, and so they employ models to recommend products consumers are likely to purchase. The models estimate the likelihood of a consumer to purchase the product based on prior purchase behavior, and select the products most likely to be purchased for display in product recommendation. But ecommerce business operators must also keep in mind their supplier relationships. Even if it is for a good reason (e.g., consumers are more likely to purchase), if the product recommendation model selects products from a small set of suppliers too frequently, the ecommerce business runs the risk of angering other suppliers, whose products were featured less often in product recommendations. The presently described systems and methods can be used to mitigate this apparent 'supplier bias' in product recommendation models by building fair alternative models that seek to equalize the likelihood of recommending products from any supplier. In the presently described systems and methods, each supplier corresponds to a protected attribute, and the model is a purchase likelihood model instead of a probability of default model. In variations, the product recommendation model is trained for each consumer based on the consumer's browsing history with an adversarial model that predicts the likelihood a product recommendation is from a given supplier. In this way, the present invention can be used to make product recommendation models that do not favor any one supplier and are more fair to all suppliers.

In some variations, one or more of the components of the system are implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in the hardware device are communicatively coupled via a bus. In some variations, one or more components included in the hardware system are communicatively coupled to an external system (e.g., an operator device 120) via the communication interface.

The communication interface functions to communicate data between the hardware system and another device (e.g., the operator device 120, a model execution system, etc.) via a network (e.g., a private network, a public network, the Internet, and the like).

In some variations, the storage device includes the machine-executable instructions of one or more of a model 111, an adversarial classifier 112, a user interface 115, an application server 114, and a training module that functions to perform at least a portion of the method 200 described herein.

In some variations, the storage device includes data 113. In some variations, the data 113 includes one or more of training data, outputs of the model 111, outputs of the adversarial classifier 112, accuracy metrics (as described herein), fairness metrics (as described herein), economic projections (as described herein) and the like.

The input device functions to receive user input. In some variations, the input device includes at least one of buttons and a touch screen input device (e.g., a capacitive touch input device).

In some variations, the method functions to train at least one model (e.g., 111). In some variations, the method functions to train at least one model that minimizes (at least within a degree) differences in the distribution of model predictions for populations with one or more selected features (attributes).

The example method 200 includes at least one of: identifying sensitive attributes S210; accessing training input S220; and training at least one prediction model (e.g., a tree-based prediction model) that satisfies fairness criteria for the identified sensitive attributes S230. The method optionally includes one or more of: generating evaluation information for at least one trained prediction model (e.g., by generating at least one fairness metric and at least one accuracy metric) S240; and providing generated evaluation information for at least one trained prediction model (e.g., via a report, via a user interface, etc.) S250.

In some variations, at least one component of the system (e.g., 100) performs at least a portion of the method 200.

Identifying sensitive attributes S210 can include receiving a selection of one or more sensitive attributes from one or more of: a network interface, a user interface (e.g., provided by an application server, etc.), an application programming interface (API), and a storage device. In some examples, the system 100 provides a user interface (e.g., by using an application server), and the system 100 receives a selection of one or more sensitive attributes via the user interface. In some examples, the system 100 accesses information that identifies one or more sensitive attributes from a data store or document (e.g., a document that describes fair lending laws and attributes that should not be considered when making lending decisions, etc.). However, sensitive attributes can otherwise be identified. In another variation, the protected attribute status is inferred using the Bayesian Improved Surname Geocoding Method (BISG). Another variation identifies protected attributes based on a machine learning model trained on voter registration and other public data sources.

Accessing training input (S220) can include accessing one or more of: model training parameters, a model type selection, and training data that includes input training data rows and target labels. The model training system 110 can access the training input from one or more of a network interface, a user interface (e.g., provided by an application server, etc.), an application programming interface (API), and a storage device.

In variants, for each identified sensitive attribute (identified at S210), corresponding ground truth labels ($Z_{label}$) for the sensitive attribute are accessed for each training data row. In some implementations, a data object that represents the ground truth labels for each training data row prediction (e.g., a Y label object class) includes the ground truth labels ($Z_{label}$) for the sensitive attributes. For example, the $Y_{label}$ object class can be extended to include additional pieces of information, such as the ground truth labels ($Z_{label}$) for each sensitive attribute. In this manner, the ground truth labels ($Z_{label}$) for each identified sensitive attribute can be passed to the training function (implemented by the model training system 110) as components of the object used as the training data parameter.

By virtue of the foregoing, an existing training function can be extended to implement fairness-based training without changing the interface used by the training function. This simple yet effective design allows existing gradient-boosted tree implementations (e.g., AdaBoost, XGBoost, Catboost, LightGBM, etc.) to be extended to implement the method as described herein. In some implementations, the model training system 110 accesses the training input (at S220), and provides at least a portion of the accessed training input to a custom loss function module 119, that performs at least a portion of the training (at S230). In an example, the model training system 110 accesses the extended $Y_{label}$ object class that includes the ground truth labels ($Z_{label}$) for each identified sensitive attribute (and optionally information identifying each sensitive attribute identified at S210), and provides the custom loss function module 119 with access to the extended $Y_{label}$ object class.

In variants, after accessing the training input, the model training system 110 automatically trains the model to fit the training data (at S230). In some implementations, the model training system 110 automatically trains the model (at S230) by executing a training function (e.g., for the XGBoost python package, calling xgboost.train, or another such method as required by the machine learning library) that accepts as input the accessed training data rows and the optional model training parameters. The output of the training function is a trained version of the model. For example, the following exemplary instructions can be executed to automatically train the model to fit the training data and output a trained model:
   import xgboost
   trained_model=xgboost.train(parameters, training_data, number_of_training_iterations)

In variants, the model training system 110 is a fairness-enabled model training system that functions to iteratively adjust the model (e.g., during model training) to identify the optimal tradeoff between model fairness, with respect to at least one selected sensitive attribute (e.g., race, gender, etc.), and model accuracy—such that the fairest model is built for a given level of accuracy. In variants, sensitive attributes include features whose values are excluded from the training data, but can possibly be inferred by analyzing the training data.

In a variation, executing the training function at S230 includes training the selected model by iteratively adjusting parameters of the model until output generated by the model for each of a plurality of training data rows satisfies training stopping criteria. In some implementations, iteratively adjusting parameters of the model includes: selecting an initial set of model parameters, using the model to generate model output for each input training data row using the first set of model parameters, computing an evaluation metric for the model (having the first set of parameters), and determining whether the evaluation metric satisfies stopping criteria. If the evaluation metric does not satisfy the stopping criteria, then a parameter adjustment iteration is performed in which this process is repeated with a new set of model parameters. In variations, the stopping criteria is related to model fairness, as well as model accuracy.

Any suitable process can be used to select model parameters at each iteration, and any suitable stopping criteria and evaluation metric can be used by the model training system 110. In an example, the evaluation metric is a loss metric for the model. In this example, for each parameter adjustment iteration, the loss metric can be a statistical value computed from a set of prediction errors for each output generated by the model during the adjustment iteration. In another example, the evaluation metric includes 1) a loss metric for the prediction model; and 2) a loss metric for at least one adversarial classifier that is trained to predict a value for an identified sensitive attribute. In this example, the model can serve members with multiple sensitive attributes (e.g., African American, Hispanic, female, elderly, etc.), and the evaluation metric can include a loss metric for an adversarial classifier for each sensitive attribute.

In some embodiments, during each parameter adjustment iteration, each adversarial classifier is trained to predict a sensitive attribute value for an input row based on a prediction (generated by the current version of the prediction model) for the input row. In some embodiments, the adversary is a multi-class model trained to predict the likelihood of each sensitive attribute. In this example, for each parameter adjustment iteration, the loss metric for the prediction model can be a statistical value computed from a set of prediction errors for each output generated by the prediction model during the adjustment iteration; and for each adversarial classifier, the loss metric can be a statistical value computed from a set of prediction errors for each output generated by the adversarial classifier during the adjustment iteration. However, any suitable loss metric or evaluation metric can be used.

In a variation of execution of the training function, the model is a tree ensemble, and executing the training function (e.g., "xgboost.train( )") at S230 includes performing a tree boosting training process (e.g., a gradient tree boosting training process) that includes iteratively adding tree sub-models to a tree ensemble until output generated by the tree ensemble for each of a plurality of training data rows satisfies training stopping criteria. In some embodiments for this variation, the training function sequentially adds additional trees to the tree ensemble, i.e., a "warm start". In other embodiments for the second variation, the training function removes some or all present trees and rebuilds from scratch, i.e., a "cold start".

Figure 3A:
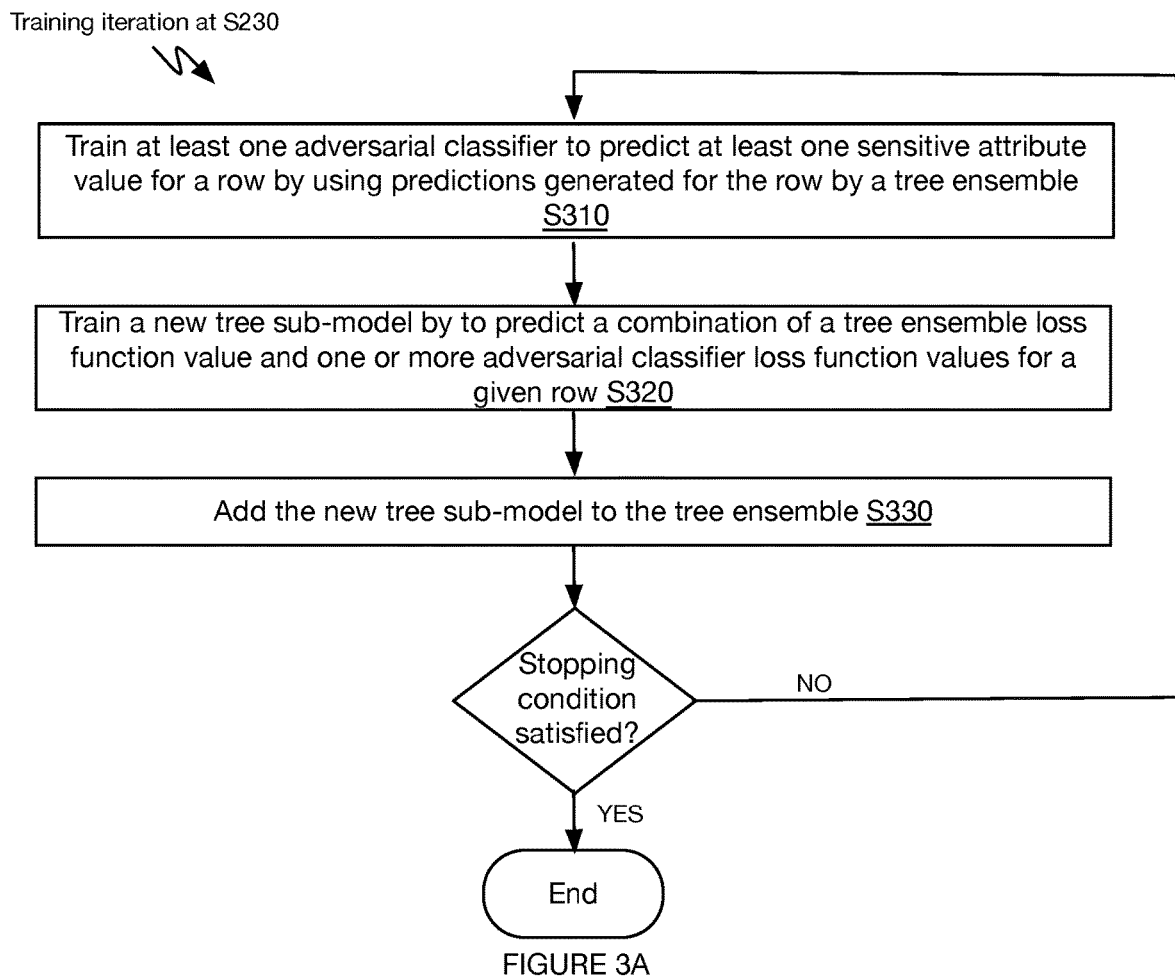
FIG. 3A is a schematic representation of an example training iteration.

The example tree boosting training process includes training the initial tree model to fit the training data, and performing one or more training iterations. Each training iteration includes: training at least one adversarial classifier to predict a sensitive attribute value for an input row based on a prediction (generated by the tree ensemble) for the input row (S310 shown in FIG. 3A); training a new tree sub-model to predict a combination of a tree ensemble loss function value and one or more adversarial classifier loss function values for a given row (S320); and adding the new tree sub-model to the tree ensemble S330. If a stopping condition is satisfied, then the training process ends. Otherwise, another training iteration is performed (at S310 shown in FIG. 3A). In variations, the stopping condition is related to model fairness and/or model accuracy.

Training an adversarial classifier to predict a sensitive attribute value for a sensitive attribute (identified at S210) (S310) can include: training the adversarial classifier (e.g., 112 shown in FIG. 1C) to predict a sensitive attribute value ($Z_{pred}$) (for the sensitive attribute) for a training data row ($X_{row}$), based on the prediction ($Y_{pred}$) for the training data row. Predictions ($Y_{pred}$) for the training data rows ($X_{row}$) are generated by the current iteration of the tree ensemble (e.g., 111 shown in FIG. 1C) for the training data rows accessed at S220. The accessed sensitive attribute ground truth labels ($Z_{label}$) (accessed at S220) and the predictions generated by the tree ensemble for the current iteration are used to train the adversarial classifier (e.g., 112). In some implementations, the adversarial classifier is a logistic regression model. However, in other implementations, the adversarial classifier (e.g., 112) can be any suitable type of model, or sets of models, designed to predict the sensitive attribute values ($Z_{preds}$).

In an example, the adversarial classifier (generated for a sensitive attribute) is represented as a sigmoid function that receives as input the sum of: 1) a weighted prediction ($Y_{pred}$) for the training data row and 2) a constant value parameter, wherein the weight and the constant parameter are learned during the training of the adversarial classifier. For example, the adversarial classifier for a sensitive attribute can be represented as: $Z_{pred}=s(aY_{pred}+b)$, where s represents the sigmoid function and a and b are the model parameters that are learned during the training of the adversarial classifier, by using the sensitive attribute ground truth labels ($Z_{label}$).

Training a new tree sub-model (S320) can include one or more of: defining a custom loss function that is a combination of 1) a tree ensemble loss function (for the tree ensemble) and 2) an adversarial classifier loss function for each adversarial classifier (trained at S310) S321; for each training data row, computing a gradient value (first-order derivative) and a Hessian value (second-order derivative) using the custom loss function S322; and generating a new tree model by using the computed gradient and Hessian values S323. In variants, training a new tree sub-model (S320) includes recording model training information S324.

In variants, a custom loss function module (e.g., 119 shown in FIG. 1C) included in the model training system 110 (e.g., a fairness-enabled XGBoost package) includes a definition for the custom loss function and functions to compute the gradient and Hessian values at S322. In variants, the custom loss function module 119 computes gradient and Hessian values for a row ($X_{row}$) given: 1) predictions ($Y_{pred}$) and associated labels ($Y_{label}$) for rows ($X_{row}$) used as input by the tree ensemble (e.g., 111 shown in FIG. 1C); and 2) labels ($Z_{label}$) for scores ($Y_{pred}$) used as input by each adversarial classifier (e.g., 112).

In variants, defining a custom loss function (S321) includes: defining the tree ensemble loss function and defining an adversarial classifier loss function for each adversarial classifier trained at S310 (wherein each adversarial classifier is trained to predict a value for a respective one of the identified sensitive attributes, identified at S210). In some implementations, the custom loss function is a linear combination of the tree ensemble loss function and each adversarial classifier loss function. In some implementations, the unique loss components may be up- or down-weighted to provide additional flexibility. For example, if there are groups with specific sensitive attributes that experience higher levels of harm, the corresponding weight can be increased to favor those particular groups. In variants the components of the loss function are combined based on demographic statistics in a population. In variants, a custom loss function module (e.g., 119 shown in FIG. 1C) included in the model training system 110 (e.g., a fairness-enabled XGBoost package) includes a definition for the custom loss function.

Figure 1C:
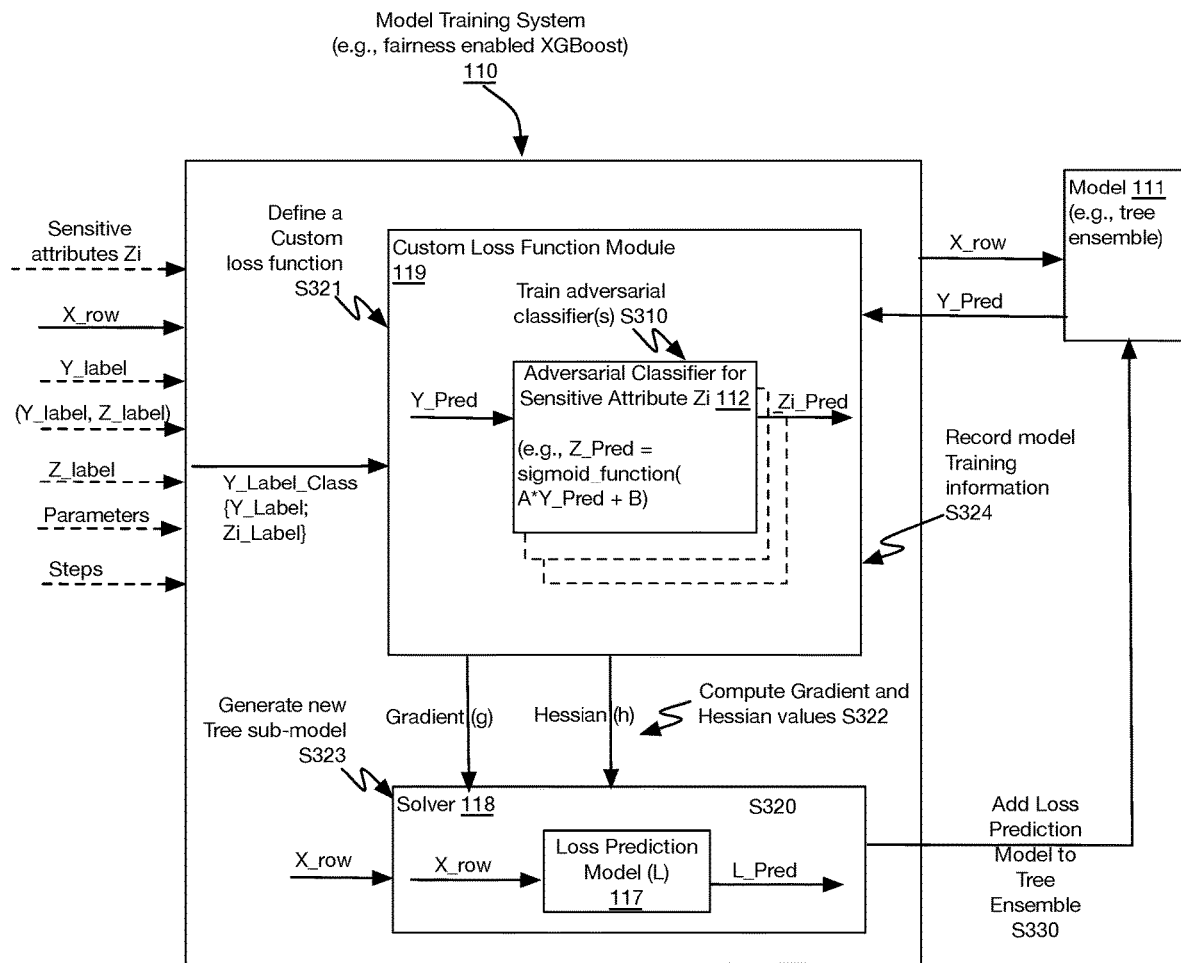
FIG. 1C is a schematic representation of an example model training system.
Figure 2:
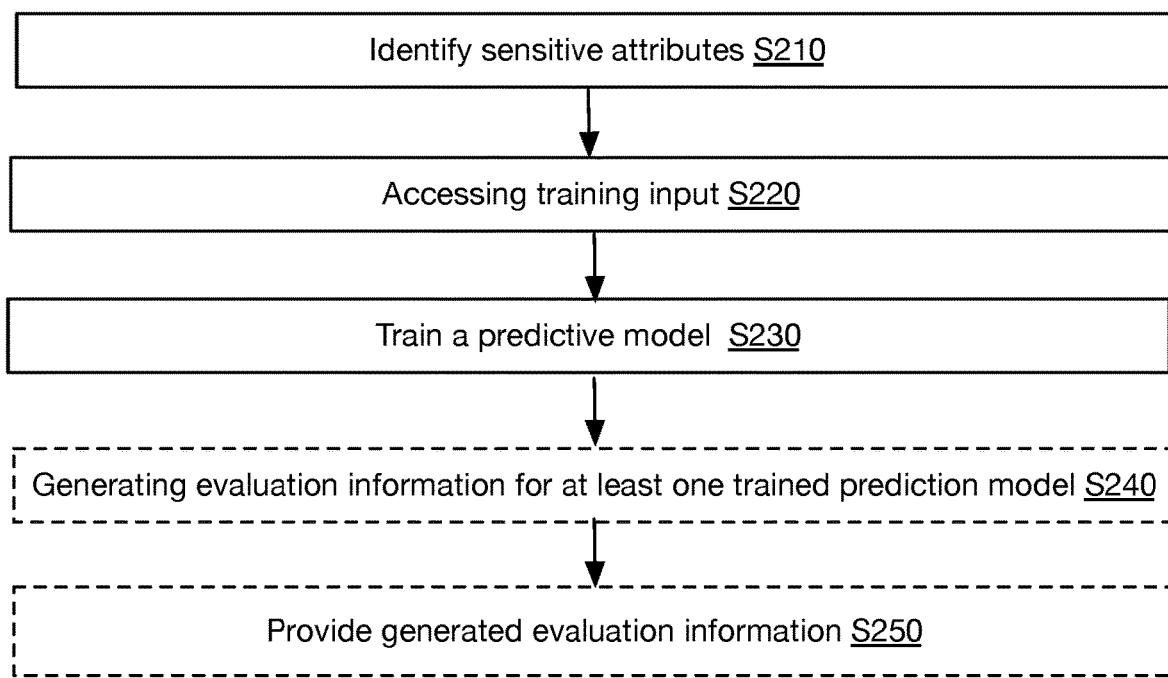
FIG. 2 is a schematic representation of an example method.

In some variations, the tree ensemble loss function is any suitable function that generates an error metric based on differences between predictions ($Y_{pred}$) and associated labels ($Y_{label}$) for rows used as input by the tree ensemble (e.g., 111 shown in FIG. 1C). In some implementations, the tree ensemble loss function includes a penalty term that penalizes the complexity of the tree ensemble.

In some variations, an adversarial classifier loss function for an associated adversarial classifier is any suitable function that generates an error metric based on differences between predictions ($Z_{pred}$) and associated labels ($Z_{label}$) for scores ($Y_{pred}$) used as input by the adversarial classifier (e.g., 112 shown in FIG. 1C).

In variants, the adversarial classifier loss function for each adversarial classifier is a log loss function. In variants, the adversarial classifier loss function for each adversarial classifier is a binary loss function.

In one example, the custom loss function is: $Y_{label}*\log(Y_{pred})+(1-Y_{label})*\log(1-Y_{pred})-P*[Z_{label}*\log(Z_{pred})+(1-Z_{label})*\log(1-Z_{pred})]$, wherein P is a scalar that represents a fairness penalty parameter. A same or similar fairness penalty parameter can be used for some or all adversarial classifier loss functions included in the evaluation metric. Alternatively, one or more of the adversarial classifier loss functions can have different fairness penalty parameters. In this example, $Z_{pred}=s(aY_{pred}+b)$, where s represents the sigmoid function and a and b are the model parameters that are learned during training of the adversarial classifier, by using the sensitive attribute ground truth labels ($Z_{label}$). In examples, the gradient for the custom loss function is given by: $s(d)-Y_{label}-P$ a $(Z_{pred}-Z_{label})*\alpha Y_{pred}(1-Y_{pred})$ where d is the margin score or log likelihood of the gradient boosting learning algorithm and s is the sigmoid function. In this example, the Hessian for the custom loss function (determined at S325) is the partial derivative of the gradient above. In variations P is set to 0 in the gradient equation prior to computing the Hessian and providing the Hessian to the gradient boosting learning algorithm. In examples, the custom loss function and associated gradient and Hessian are provided to the gradient boosted decision tree learning algorithm so that the gradient boosted decision tree algorithm can grow an ensemble of trees based on the provided custom loss, gradient and Hessian. In other examples the loss function for the tree ensemble is a mean squared error and this regression loss is combined similarly as above, with the adversarial classification loss.

Figure 4:
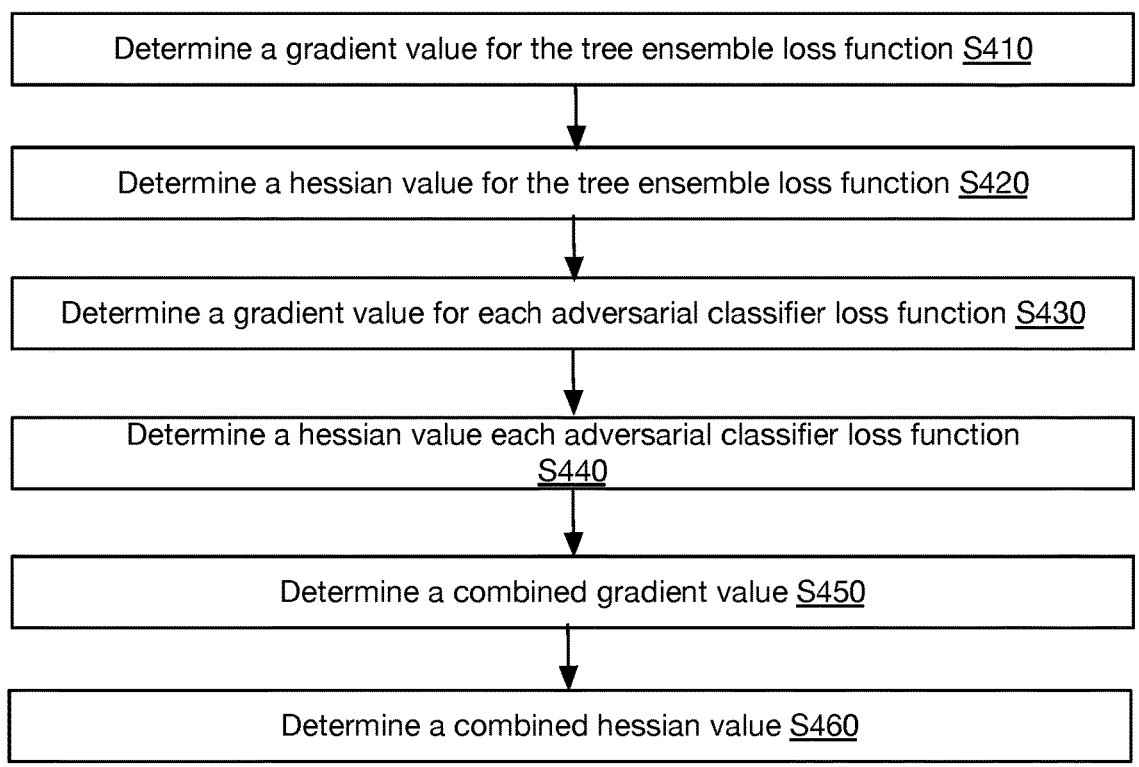
FIG. 4 is a schematic representation of an example computing gradient and Hessian values using a custom loss function.

Computing a gradient value and a Hessian value for a row using the custom loss function (S322) can include: determining a gradient value (first-order gradient) for the tree ensemble loss function S410; determining a Hessian value (second-order gradient) for the tree ensemble loss function S420; for each adversarial classifier loss function, determining a gradient value S430; for each adversarial classifier loss function, determining a Hessian value S440; determining a combined gradient value for the custom loss function S450; and determining a combined Hessian value for the custom loss function S460, as shown in FIG. 4. In variants, the gradient values for a row can be combined as a linear combination with any suitable selection of coefficients. However, the gradient values for a row can otherwise be combined. In variants, the Hessian values for a row can be combined as a linear combination with any suitable selection of coefficients. However, the Hessian values for a row can otherwise be combined.

In variants, the components of the loss function, which include the gradients and Hessians for the accuracy or fairness objective(s), or various combinations of these objectives, can be weighted according to user-provided sample weights for observations in the model training dataset. In one implementation, the sample weights are set to control the influence of each data point on the model during the training process, so that the underlying information passed to the model training system is more reflective of expectations for when the model will be deployed, e.g., matching future expected time—variant behavior. In variants, sample weights can be specific to model classification/regression targets ($Y_{label}$), demographic targets ($Z_{label}$), or both. In variants, these cases are supported by linearly scaling the gradient, Hessian, and/or combinations of these components by the sample weights provided such that the risk objective (for accuracy), fairness objective (for sensitive attributes), or combinations thereof, receive selective influence from specific training observations. In variants, all sample weights may be set to unity if they are not required.

In variants, in a case where the Hessian value for an adversarial classifier loss function (for a given row) is not greater than or equal to zero, the Hessian value is set to a zero value. Alternatively, the Hessian for the adversarial classifier is always set to a zero value in cases where the Hessian value must always be greater than or equal to zero. These and similar modifications ensure that the Hessian values are positive semi-definite, which in implementations often has shown to improve the efficiency and robustness of the optimization process.

In variants, a solver module (e.g., 118 shown in FIG. 1C) included in the model training system 110 (e.g., a fairness-enabled XGBoost package) functions to generate the new tree model (e.g., 117 shown in FIG. 1C) by using the computed gradient and Hessian values at S323. In an example, the solver 118 is a conventional tree-boosting solver (e.g., a tree solver that performs an XGBoost process for generating regression trees, etc.).

In variants, generating the new tree model includes: defining a new tree model (at S323) by using the combined gradient values (determined at S450) and the combined Hessian values (determined at S460). In variants, the new tree model is defined by using the combined gradient values and the combined Hessian values (for the custom loss function) to determine a tree structure for the new tree model. In some implementations, determining a new tree model includes determining which features of the prediction model to split, and determining which feature value to use to define a feature split.

In variants, during each training iteration, model training information is recorded (e.g., at S324 shown in FIG. 3B). In some variations, the custom loss function module 119 generates the model training information. In some implementations, the custom loss function module 119 records the generated model training information in a data storage device (e.g., 113). However, any suitable component of the modeling system 100 can receive the model training information from the custom loss function module 119, and record the received information in the data storage device.

The model training information recorded at S324 for a training iteration can include one or more of: custom loss function values computed during the training iteration; statistics computed for custom loss function values computed during the training iteration; tree ensemble loss function values computed during the training iteration; statistics computed for tree ensemble loss function values computed during the training iteration; tree ensemble loss function gradient values computed during the training iteration; statistics computed for tree ensemble loss function gradient values computed during the training iteration; tree ensemble loss function Hessian values computed during the training iteration; statistics computed for tree ensemble loss function Hessian values computed during the training iteration; adversarial classifier loss function values computed during the training iteration; statistics computed for adversarial classifier loss function values computed during the training iteration; adversarial classifier loss function gradient values computed during the training iteration; statistics computed for adversarial classifier loss function gradient values computed during the training iteration; adversarial classifier loss function Hessian values computed during the training iteration; statistics computed for adversarial classifier loss function Hessian values computed during the training iteration; a fairness metric computed for the tree ensemble during the training iteration; an accuracy metric generated for the tree ensemble during the training iteration; an accuracy metric generated for an adversarial classifier during the training iteration; information related to rows ($X_{row}$) used during the training iteration; information related to tree ensemble predictions ($Y_{pred}$) used during the training iteration; information related to row labels ($Y_{label}$) used during the training iteration; information related to training parameters used during the training iteration; information related to sensitive attributes selected for the training iteration; information related to sensitive attribute predictions ($Z_{pred}$) generated by adversarial classifiers during the training iteration; information related to sensitive attribute labels ($Z_{pred}$) used during the training iteration; and information identifying the most recent training iteration; and information identifying feature importance of one or more features used by the tree ensemble model (e.g., 111) to generate the predictions ($V_{pred}$) during the training iteration.

After the new tree model is generated, it is added to the tree ensemble at S330. If a stopping condition is satisfied, then the training process ends. Otherwise, another training iteration is performed (starting at S310 shown in FIG. 3A). Any suitable stopping condition can be used (e.g., resource-based (wall clock time, number of iterations, etc.), fairness metric criteria, accuracy metric criteria, etc.). In variations, the stopping condition is related to model fairness, as well as model accuracy.

In some variations, fairness penalty parameters (P) of the adversarial classifier loss functions can be adjusted to change the balance between improving accuracy and improving fairness of the tree ensemble, or some other plurality of objectives. In some implementations, the model can serve members with multiple sensitive attributes (e.g., African American, Hispanic, female, elderly, etc.), and the evaluation metric can include a loss metric for an adversarial classifier for each sensitive attribute.

The fairness penalty parameter can be adjusted to increase fairness of resulting models, or increase accuracy of resulting models (at the expense of fairness), and, in general, adjusting the importance of any of a plurality of objectives. By adjusting this parameter (or parameters), models with different fairness-vs-accuracy characteristics (or any plurality of objectives) can be generated (at S230), evaluated, and selected for use in a production environment.

A same fairness penalty parameter can be used for some or all adversarial classifier loss functions included in the evaluation metric. When generating model alternatives that serve members (observations) with multiple sensitive: attributes (e.g., African American, Hispanic female, elderly groups), some or all protected classes can be aggregated into a single protected group and alternatives can be searched for by adjusting a single fairness penalty parameter. Each new alternative model can be analyzed by aggregating or disaggregating by protected class (e.g. different fairness measures for African American, Hispanic, female, elderly). In certain circumstances, while the overall model will be fairer, the different protected classes may experience more/less harm, i.e., the model is fairer for the overall group of protected members, but is not for some members belonging to one or more protected classes (e.g., African American, Hispanic, female, elderly).

Such situations may violate certain business/regulatory constraints. For example, such constraints may mandate that models generated through this process are (1) not viable if any protected class experiences any harm, or (2), viable only if the level of harm to individual classes remains at or above some threshold, e.g., parity with the unprotected class. To meet these constraints, one can refit the alternative, but rather than adjusting a single fairness penalty for all protected members, one can adjust different fairness penalties for each protected class, which in turn, allows the training process to control the objective fairness level for each individual class in a separate manner.

Accordingly, in variants, one or more of the adversarial classifier loss functions can have different fairness penalty parameters, and the fairness penalty parameters for each adversarial classifier loss function can be adjusted independently.

Finding the optimal model that maximizes the benefit to members with sensitive attributes (e.g., utilitarian or otherwise), which also satisfies constraints, can occur through a manual and iterative process, or may be automated through a higher-level optimizer that sits atop the lower level model alternative search process. In variants, the optimizer would receive as inputs: (1) the objective (e.g., how to define benefit to members with sensitive attributes), (2) the constraints (e.g., harm is never allowed to specific groups), and (3) access/control to all fairness penalties.

Such a system for generating alternative models with different fairness-vs-accuracy characteristics can be automated and controlled by a higher-level algorithmic searching module, e.g., an approach that targets specific conditions with a line-search method, binary splitting, etc., to provide models that meet specific constraints with respect to fairness, accuracy, or fairness and accuracy. In variants, the method considers two objectives: loss (accuracy) and fairness (accuracy of a secondary classifier). In other variants the method considers more than two objectives.

The model training system 110 can access the fairness penalty parameter value (or values) from one or more of: a network interface, a user interface (e.g., provided by an application server, etc.), an application programming interface (API), and a storage device. For example, a user interface can receive a selection of the features from a user, as well as the fairness penalty parameter. Alternatively, the user can provide one or more fairness and accuracy thresholds, and the model training system 110 can automatically adjust the fairness penalty parameter(s) to generate a set of models whose fairness and accuracy metrics satisfy the fairness and accuracy thresholds. In some variations, the modeling system selects the fairness penalty parameter based on a gradient and a common search algorithm. However, the fairness parameter can otherwise be selected.

After training a prediction model at S230, evaluation information is generated for at least one trained prediction model (S240). Generating evaluation information can include generating at least one fairness metric and at least one accuracy metric for a trained model. However, any suitable evaluation information can be generated at S240. In variants, at least one component of the modeling system 100 generates the evaluation information (at S240) by using model training information recorded at S324 (e.g., by using the custom loss function module 119) for one or more training iterations.

In some variants, at least one component of the system 100 generates a fairness metric for the tree ensemble by generating feature importance information for one or more features used by the tree ensemble. In some implementations, the modeling system 100 identifies feature importance values for each sensitive attribute identified at S210, and compares the feature importance of each sensitive attribute to a respective fairness criteria.

In variants, feature importance information can be generated (at S240) by performing a generalized integrated gradients decomposition method, such as one or more of the methods described in U.S. Application Publication No. US-2020-0265336 ("SYSTEMS AND METHODS FOR DECOMPOSITION OF DIFFERENTIABLE AND NON-DIFFERENTIABLE MODELS"), filed 19 Nov. 2019, the contents of which is incorporated by reference herein. Any suitable component of the system 100 can perform the generalized integrated gradients decomposition method at S240.

In an example, fairness criteria can identify importance thresholds for one or more of the sensitive attributes, and the fairness metric can be evaluated by comparing the feature importance of each sensitive attribute to the respective threshold.

In some variations, generating a fairness metric for the tree ensemble includes computing at least one fairness metric for at least one training iteration based on data recorded at S324.

In variants, generating a fairness metric for the tree ensemble includes generating a correct prediction percentage for at least one sensitive attribute relating to sensitive attribute predictions generated by an adversarial classifier (e.g., 112). In some variations, the fairness metric is the EEOC fairness ratio (otherwise known as the Adverse Impact Ratio), given by the percentage of approvals for a protected class divided by the percentage of approvals for the unprotected class. In some variations, the fairness metric is a fairness metric described in The U.S. Equal Employment Opportunity Commission, FEDERAL REGISTER,/VOL. 44, NO. 43/FRIDAY, Mar. 2, 1979 [6570-06-M], the contents of which are hereby incorporated by reference.

In some variations, generating a fairness metric for the tree ensemble includes computing at least one accuracy metric for at least one training iteration based on data recorded at S324. Accuracy metrics can include one or more of Area-Under-the-Curve (AUC) metrics, Gini, KS, F1 score, and other accuracy values and statistics relating to the predictive accuracy of model outputs generated by the trained model (e.g., 111). In some variations, the accuracy metric is selected by an operator from a user interface providing analysis capabilities to an analyst. In some variations, the accuracy metric is a function provided by an operator, including an economic projection of approved loan profitability based on a credit policy, or other computable function.

In variants, generating evaluation information (S240) includes generating explanation information by performing a credit assignment process that assigns an importance to the data variables of inputs used the tree ensemble to generate a score or result, and using the explanation information to generate an evaluation result. The data variables of inputs used by the tree ensemble may include various predictors, including: numeric variables, binary variables, categorical variables, ratios, rates, values, times, amounts, quantities, matrices, scores, or outputs of other models. The result may be a score, a probability, a binary flag, a category, or other numeric value.

The credit assignment process can include a differential credit assignment process that performs credit assignment for an evaluation input by using one or more reference inputs. In some embodiments, the credit assignment method is based on Shapley values. In some embodiments, the credit assignment method is based on Aumann-Shapley values. In some embodiments, the credit assignment method is based on Tree SHAP, Kernel SHAP, interventional tree SHAP, Integrated Gradients, Generalized Integrated Gradients, or a combination thereof.

Evaluation inputs can be generated inputs, inputs from a population of training data, inputs from a population of validation data, inputs from a population of production data (e.g., actual inputs processed by the machine learning system in a production environment), inputs from a synthetically generated sample of data from a given distribution, etc. In some embodiments, a synthetically generated sample of data from a given distribution is generated based on a generative model. In some embodiments, the generative model is a linear model, an empirical measure, a Gaussian Mixture Model, a Hidden Markov Model, a Bayesian model, a Boltzman Machine, an autoencoder, a Variational autoencoder, a Generative Adversarial Network or an ensemble of various model types, including a blended ensemble or a stacked ensemble.

Reference inputs can be generated inputs, inputs from a population of training data, inputs from a population of validation data, inputs from a population of production data (e.g., actual inputs processed by the machine learning system in a production environment), inputs from a synthetically generated sample of data from a given distribution, etc.

The total population of evaluation inputs and/or reference inputs can increase as new inputs are processed by the machine learning system (e.g., in a production environment). For example, in a credit risk modeling implementation, each newly evaluated credit application is added to the population of inputs that can be used as evaluation inputs, and optionally reference inputs. Thus, as more inputs are processed by the machine learning system, the number of computations performed during evaluation of the machine learning system can increase.

Generating explanation information by performing a credit assignment process can include performing computations from one or more inputs (e.g., evaluation inputs, reference inputs, etc.). In some variations, the inputs are sampled (e.g., by performing a Monte Carlo sampling process) from at least one dataset that includes a plurality of rows that can be used as inputs (e.g., evaluation inputs, reference inputs, etc.). Sampling can include performing one or more sampling iterations until at least one stopping criterion is satisfied.

Stopping criteria can include any suitable type of stopping criteria (e.g., a number of iterations, a wall-clock runtime limit, an accuracy constraint, an uncertainty constraint, a performance constraint, convergence stopping criteria, etc.). In some variations, the stopping criterion includes an accuracy constraint that specifies a minimum value for a sampling metric that identifies convergence of sample-based explanation information (generated from the sample being evaluated) to ideal explanation information (generated without performing sampling). In other words, stopping criteria can be used to control the system to stop sampling when a sampling metric computed for the current sample indicates that the results generated by using the current sample are likely to have an accuracy measure above an accuracy threshold related to the accuracy constraint. In this way, the example method provides the practical and useful function of limiting the number of calculations to those required to determine an answer with sufficient accuracy, certainty, wall-clock run time, or combination thereof. In some variations, the stopping criteria are specified by an end-user via a user interface. In some variations, the stopping criteria are specified based on a grid search or analysis of outcomes. In some variations, the stopping criteria are determined based on a machine learning model.

Convergence stopping criteria can include a value, a confidence interval, an estimate, tolerance, range, rule, etc., that can be compared with a sampling metric computed for a sample (or sampling iteration) of the one or more datasets being sampled to determine whether to stop sampling and invoke an explanation system and generate evaluation results. The sampling metric can be computed by using the inputs sampled in the sampling iteration (and optionally inputs sampled in any preceding iterations). The sampling metric can be any suitable type of metric that can measure asymptotic convergence of sample-based explanation information (generated from the sample being evaluated) to ideal explanation information (generated without performing sampling). In some variations, the sampling metric is a t-statistic (e.g., bound on a statistical t-distribution) wherein each model prediction is a Bernoulli trial. However, any suitable sampling metric can be used.

In variants, in cases in which several versions of the tree ensemble are trained (each with a different fairness penalty parameter), one or more of the tree ensembles can be selected based on associated final accuracy and fairness metrics. In some variations, a single model is automatically selected based on received user input (e.g., received via the operator device 120, the user interface 115, etc.). In some variations, a single model is automatically selected based on predetermined model selection criteria and the recorded accuracy and fairness metrics. In some variations, selection criteria include at least one of an accuracy threshold, and a fairness threshold for at least one sensitive attribute.

In variants, providing generated evaluation information (S250) includes providing a user interface that displays evaluation information (generated at S240) for at least one trained prediction model S250. In variants, providing generated evaluation information includes generating at least one report that includes generated evaluation information, and providing at least one report. Any suitable component of the system 100 can provide the generated evaluation information at S250.

In some variations, at S250 the modeling system 100 automatically generates a selection report that includes accuracy and fairness metrics for the selected model, and optionally other models that were trained but not selected. The modeling system can provide the selection report to an operator device (e.g., 120). In this manner, an operator is notified of the selected model, fairness and accuracy metrics for the selected model, and fairness and accuracy metrics for models not selected. In some variations, the report includes an economic analysis including a comparison of profitability metrics such as loan losses and interest collected for a plurality of model variations. By virtue of providing this information, an operator can be notified of information justifying the selection of the selected model.

In some variations, the selection report also includes fairness penalty parameter values for each model. In some variations, the selection report includes model input contributions, quantifying the influence of a model input variable on the model's decisions overall and for each protected class, for any model in the analysis. In some variations, the selection report includes the contribution of two-way or n-way combinations of input variables, for any model in the analysis. In some variations, the selection report includes a histogram of adverse action reason codes or model explanations for each alternative model. In some variations, the selection report includes partial dependence plots, ICE plots, and other charts showing the influence of each model input variable over a range of values, with respect to each model and disaggregated by protected attributes.

In some variations, a user interface (e.g., 115) includes the selection report. In some variations, the user interface is a graphical user interface. In some variations, the user interface is provided by an application server (e.g., 114 shown in FIG. 1A). In some variations, the user interface displays information for each tree ensemble trained by the system 100. In some variations, information for a tree ensemble includes: model metadata (as described herein), accuracy metrics, fairness metrics, and the like. In some variations, the user interface includes a user-input element for receiving user-selection of at least one of: a tree ensemble trained by the system 110; a fairness penalty parameter; a sensitive attribute; the model selection criteria; information identifying one or more features that are to be unchanged during adversarial training; model constraint parameters, and/or any other suitable information.

By virtue of the displayed user interface, an operator of the operator device (e.g., 120) can determine whether a trained tree ensemble satisfies fairness and accuracy requirements, as well as other model constraints and/or business requirements.

In some variations, the system 100 produces reports that document the analysis and model selection process in order to enable compliance with ECOA. In some embodiments, the system 100 produces reports that document the analysis and model selection process in order to enable compliance with other regulations including, GDPR, GLBR, FCRA, and/or other regulations, as required or recommended by the municipal, county, state, regional, national or international levels, without limitation. In some variations, the system 100 produces reports that enable enterprise risk managers, governance bodies, auditors, regulators, judges and juries to assess model risk, the risk of unfair outcomes from the adoption of models, and to audit the process businesses use to measure and mitigate algorithmic bias.

Figure 5:
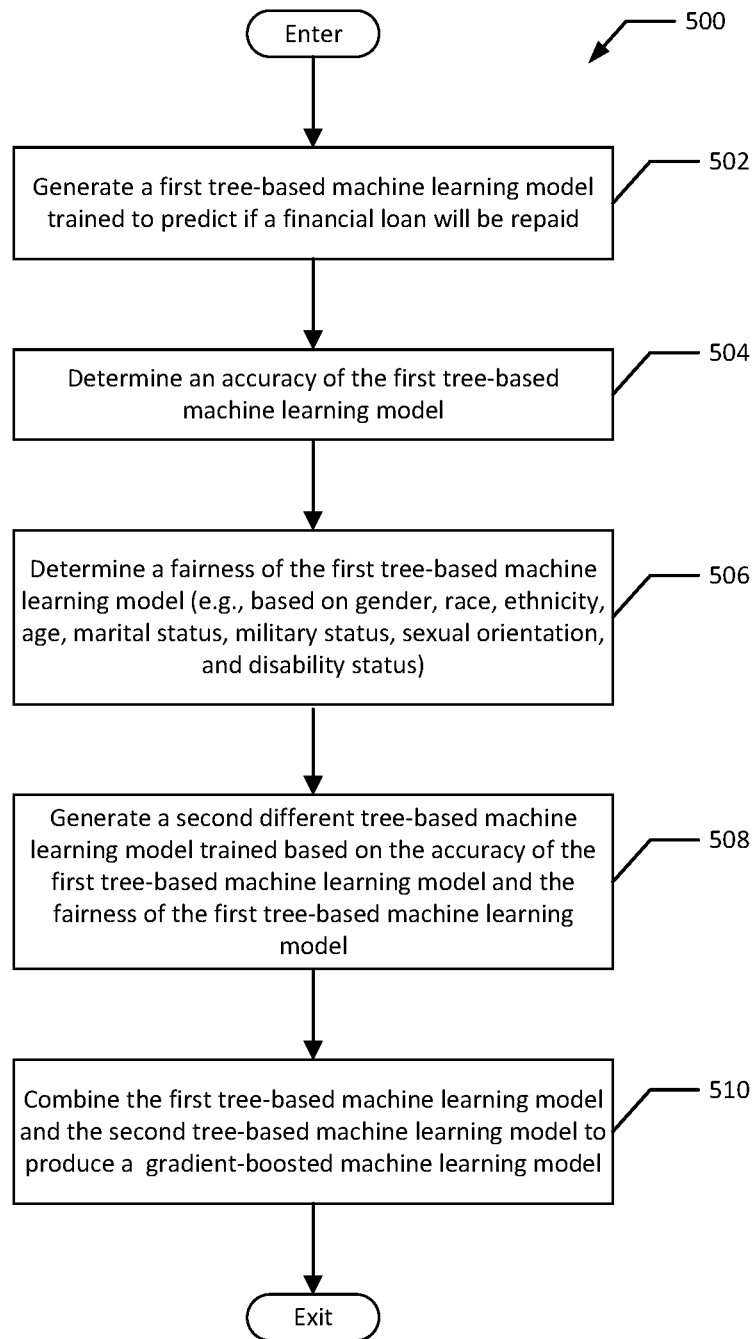
FIG. 5 is flowchart of an example method for producing a gradient-boosted machine learning model associated with a financial loan.

FIG. 5 is a flowchart of an example process 500 for generating tree-based models with improved fairness. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In this example, the process 500 begins by generating a first tree-based machine learning model. The first tree-based machine learning model is preferably trained to predict if the financial loan will be repaid (block 502). The process 500 then determines an accuracy of the first tree-based machine learning model (block 504). The process 500 then determines a fairness of the first tree-based machine learning model (block 506). The fairness is preferably associated with at least one of gender, race, ethnicity, age, marital status, military status, sexual orientation, and disability status.

The process 500 then generates a second different tree-based machine learning model (block 508). The second tree-based machine learning model is preferably trained based on the accuracy of the first tree-based machine learning model and the fairness of the first tree-based machine learning model. The process 500 then combines the first tree-based machine learning model and the second tree-based machine learning model to produce a gradient-boosted machine learning model (block 510).

Embodiments of the systems and/or methods can include every suitable combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

In summary, persons of ordinary skill in the art will readily appreciate that systems and methods for generating tree-based models with improved fairness have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

We claim:

1. A method of automated loan application processing using machine learning credit modeling that maximizes predictive accuracy and outcome parity, the method implemented by a modelling system and comprising:
    training a first tree-based machine learning model to predict loan repayment probability;
    determining an accuracy metric and a fairness metric of the first tree-based machine learning model, the fairness being associated with one or more classes of individuals;
    training a second different tree-based machine learning model based on the accuracy and the fairness metrics of the first tree-based machine learning model;
    deploying a gradient-boosted machine learning model generated by combining the first and second tree-based machine learning models;
    applying the gradient-boosted machine learning model to application data for a loan extracted from a received credit application to generate evaluation data comprising at least a score corresponding to a likelihood that the loan will be repaid; and
    automatically providing an electronic lending decision in response to the received credit application, wherein the lending decision is based on the score in the evaluation data.

2. The method of claim 1, further comprising:
    rejecting the loan based on the gradient-boosted machine learning model and the application data; and
    generating and outputting an electronic adverse action communication comprising a retrieved fairness explanation associated with the gradient-boosted machine learning model.

3. The method of claim 1, wherein the one or more classes of individuals correspond to gender, race, ethnicity, age, marital status, military status, sexual orientation, or disability status.

4. The method of claim 1, further comprising determining whether the first tree-based machine learning model satisfies one or more fairness criteria for one or more sensitive attributes obtained via a provided graphical user interface.

5. The method of claim 4, further comprising executing a training function to train the first tree-based machine learning model based on obtained training data that includes input training data rows and target labels, wherein the target labels comprise a ground truth label for each of the sensitive attributes for each of the training data rows.

6. The method of claim 5, further comprising:
    training an adversarial classifier to predict a value for each of the sensitive attributes using the ground truth labels;
    for each of the training data rows, generating a gradient value and a Hessian value using a loss function, wherein the loss function is a combination of a tree ensemble loss function and an adversarial classifier loss function for each of the adversarial classifiers; and
    generating the second different tree-based machine learning model using the gradient and Hessian values.

7. The method of claim 6, further comprising determining a correct prediction percentage for at least one of the sensitive attributes relating to at least one sensitive attribute prediction generated by one of the adversarial classifiers to generate the fairness metric.

8. A modelling system, comprising memory comprising instructions stored thereon and one or more processors coupled to the memory and configured to execute the stored instructions to:
    train a first tree-based machine learning model to predict loan repayment probability using obtained training data;
    for each of a plurality of training data rows in the training data, generate a gradient value and a Hessian value;
    determine an accuracy metric and a fairness metric of the first tree-based machine learning model, the fairness being associated with one or more classes of individuals;
    train a second different tree-based machine learning model based on the accuracy and the fairness metrics of the first tree-based machine learning model and the gradient and Hessian values;
    deploy a gradient-boosted machine learning model generated by combining the first and second tree-based machine learning models;
    apply the gradient-boosted machine learning model to application data for a loan extracted from a received credit application to generate evaluation data comprising at least a score corresponding to a likelihood that the loan will be repaid; and
    automatically provide an electronic lending decision in response to the received credit application, wherein the lending decision is based on the score in the evaluation data.

9. The modelling system of claim 8, wherein the one or more processors are further configured to execute the stored instructions to:
    reject the loan based on the gradient-boosted machine learning model and the application data; and
    generate and output an electronic adverse action communication comprising a retrieved fairness explanation associated with the gradient-boosted machine learning model.

10. The modelling system of claim 8, wherein the one or more classes of individuals correspond to gender, race, ethnicity, age, marital status, military status, sexual orientation, or disability status.

11. The modelling system of claim 8, wherein the one or more processors are further configured to execute the stored instructions to determine whether the first tree-based machine learning model satisfies one or more fairness criteria for one or more sensitive attributes obtained via a provided graphical user interface.

12. The modelling system of claim 11, wherein the one or more processors are further configured to execute the stored instructions to execute a training function to train the first tree-based machine learning model based on the training data, wherein the training data further includes target labels comprising ground truth labels for each of the sensitive attributes for each of the training data rows.

13. The modelling system of claim 12, wherein the one or more processors are further configured to execute the stored instructions to
    train an adversarial classifier to predict a value for each of the sensitive attributes using the ground truth labels; and
    generate the gradient and Hessian values using a loss function, wherein the loss function is a combination of a tree ensemble loss function and an adversarial classifier loss function for each of the adversarial classifiers.

14. The modelling system of claim 13, wherein the one or more processors are further configured to execute the stored instructions to determine a correct prediction percentage for at least one of the sensitive attributes relating to at least one sensitive attribute prediction generated by one of the adversarial classifiers to generate the fairness metric.

15. A non-transitory computer readable medium having stored thereon instructions for automated loan application processing using machine learning credit modeling that maximizes predictive accuracy and outcome parity comprising executable code that, when executed by one or more processors, causes the one or more processors to:
    determine an accuracy metric and a fairness metric of a first tree-based machine learning model, the fairness being associated with one or more classes of individuals and the first tree-based machine learning model trained on training data that comprises input training data rows and target labels, the target labels comprise a ground truth label for each of the one or more sensitive attributes for each of the training data rows;
    deploy a gradient-boosted machine learning model generated by combining the first tree-based machine learning model and the second tree-based machine learning model, wherein the second tree-based machine learning model is trained on the accuracy and fairness metrics of the first tree-based machine learning model;
    apply the gradient-boosted machine learning model to application data for a loan extracted from a received credit application to generate evaluation data comprising at least a score corresponding to a likelihood that the loan will be repaid; and
    automatically provide an electronic lending decision in response to the received credit application, wherein the lending decision is based on the score in the evaluation data.

16. The non-transitory computer readable medium of claim 15, wherein the executable code, when executed by one or more processors, further causes the one or more processors to:
    reject the loan based on the gradient-boosted machine learning model and the application data; and
    generate and output an electronic adverse action communication comprising a retrieved fairness explanation associated with the gradient-boosted machine learning model.

17. The non-transitory computer readable medium of claim 15, wherein the one or more classes of individuals correspond to gender, race, ethnicity, age, marital status, military status, sexual orientation, or disability status.

18. The non-transitory computer readable medium of claim 15, wherein the executable code, when executed by one or more processors, further causes the one or more processors to determine whether the first tree-based machine learning model satisfies one or more fairness criteria for one or more of the sensitive attributes.

19. The non-transitory computer readable medium of claim 15, wherein the executable code, when executed by one or more processors, further causes the one or more processors to:
    train an adversarial classifier to predict a value for each of the sensitive attributes using the ground truth labels;
    for each of the training data rows, generate a gradient value and a Hessian value using a loss function, wherein the loss function is a combination of a tree ensemble loss function and an adversarial classifier loss function for each of the adversarial classifiers; and generate the second different tree-based machine learning model using the gradient and Hessian values.

20. The non-transitory computer readable medium of claim 19, wherein the executable code, when executed by one or more processors, further causes the one or more processors to determine a correct prediction percentage for at least one of the sensitive attributes relating to at least one sensitive attribute prediction generated by one of the adversarial classifiers to generate the fairness metric.

* * * * *